United States Patent
Nakakita et al.

(10) Patent No.: US 6,799,551 B2
(45) Date of Patent: Oct. 5, 2004

(54) DIRECT INJECTION TYPE INTERNAL COMBUSTION ENGINE

(75) Inventors: Kiyomi Nakakita, Aichi-gun (JP); Takayuki Fuyuto, Aichi-gun (JP); Kazuhisa Inagaki, Aichi-gun (JP); Yoshihiro Hotta, Aichi-gun (JP); Kazuhiro Akihama, Aichi-gun (JP); Minaji Inayoshi, Aichi-gun (JP); Ichiro Sakata, Aichi-ken (JP)

(73) Assignees: Kabushiki Kaisha Toyota Chuo Kenkyusho, Aichi-gun (JP); Toyota Jidosha Kabushiki Kaisha, Toyota (JP)

( * ) Notice: Subject to any disclaimer, the term of this patent is extended or adjusted under 35 U.S.C. 154(b) by 99 days.

(21) Appl. No.: 10/181,784

(22) PCT Filed: Jan. 24, 2001

(86) PCT No.: PCT/JP01/00424

§ 371 (c)(1),
(2), (4) Date: Jul. 22, 2002

(87) PCT Pub. No.: WO01/55567

PCT Pub. Date: Aug. 2, 2001

(65) Prior Publication Data

US 2003/0005907 A1 Jan. 9, 2003

(30) Foreign Application Priority Data

Jan. 25, 2000 (JP) ........................................ 2000-015634
Jan. 25, 2000 (JP) ........................................ 2000-015672
Feb. 29, 2000 (JP) ........................................ 2000-053974

(51) Int. Cl.$^7$ ............................. F02B 17/00; F02B 3/06; F02B 31/00
(52) U.S. Cl. ................. 123/295; 123/301; 123/302; 123/305; 123/279; 123/568.11
(58) Field of Search ................. 123/279, 295, 123/301, 302, 304, 305, 308, 306, 568.11, 568.13, 568.14

(56) References Cited

U.S. PATENT DOCUMENTS

| | | | |
|---|---|---|---|
| 4,193,382 A | * 3/1980 | Oshima | 123/259 |
| 5,086,737 A | 2/1992 | Watanabe et al. | 123/295 |
| 5,119,780 A | * 6/1992 | Ariga | 123/300 |

(List continued on next page.)

FOREIGN PATENT DOCUMENTS

| | | | |
|---|---|---|---|
| DE | 3413942 | * 1/1986 | F02B/23/06 |
| EP | 594462 | 4/1994 | |
| EP | 814245 | 12/1997 | |
| EP | 0 905 360 | 3/1999 | |
| EP | 0 937 883 | 8/1999 | |
| GB | 2 327 983 | 2/1999 | |
| JP | 63-082032 | 5/1988 | |
| JP | 6-147023 | 5/1994 | |
| JP | 6-159076 | 6/1994 | |
| JP | 7-166926 | 6/1995 | |

(List continued on next page.)

*Primary Examiner*—Hai Huynh
(74) *Attorney, Agent, or Firm*—Oblon, Spivak, McClelland, Maier & Neustadt, P.C.

(57) ABSTRACT

A state of combustion in a combustion chamber is controlled by stratifying an intake gas charge within the combustion chamber, so as to reduce amounts of harmful substances left in exhaust gas. A direct-injection type internal combustion engine in which a fuel is injected into the combustion chamber and which is arranged to stratify the intake gas charge within the combustion chamber (1) such that intake gases of different compositions exist in a central portion (13) of the combustion chamber including a position of the fuel injection, and in a peripheral portion of the combustion chamber, upon initiation of combustion of the fuel at a point of time near a terminal period of a compression stroke. The intake gases of different compositions may be intake gases having different concentrations of a specific component such as recirculated exhaust gas and the fuel.

26 Claims, 11 Drawing Sheets

U.S. PATENT DOCUMENTS

| | | | |
|---|---|---|---|
| 5,740,776 A | | 4/1998 | Enderle et al. ............. 123/299 |
| 5,765,525 A | * | 6/1998 | Ma ........................ 123/308 |
| 5,870,993 A | * | 2/1999 | Stellet et al. ............... 123/308 |
| 5,906,183 A | | 5/1999 | Echtle et al. ............... 123/301 |
| 5,918,577 A | | 7/1999 | Martelli et al. ............. 123/295 |
| 5,960,769 A | * | 10/1999 | Mashiki et al. ............. 123/308 |
| 6,213,086 B1 | * | 4/2001 | Chmela et al. ............. 123/276 |
| 6,267,096 B1 | * | 7/2001 | Vallance et al. ............ 123/301 |
| 6,305,363 B1 | * | 10/2001 | Klomp ....................... 123/533 |
| 6,318,348 B1 | * | 11/2001 | Xu ....................... 123/568.14 |
| 6,321,715 B1 | * | 11/2001 | Dong ......................... 123/295 |
| 6,341,487 B1 | * | 1/2002 | Takahashi et al. ............ 60/286 |
| 6,390,057 B2 | * | 5/2002 | Yoshizawa et al. ......... 123/295 |
| 6,393,832 B1 | * | 5/2002 | Kolmanovsky et al. ....... 60/286 |
| 6,497,213 B2 | * | 12/2002 | Yoshizawa et al. ......... 123/299 |
| 6,553,959 B2 | * | 4/2003 | Xu et al. .................... 123/295 |
| 6,553,960 B1 | * | 4/2003 | Yoshikawa et al. ......... 123/299 |

FOREIGN PATENT DOCUMENTS

| | | |
|---|---|---|
| JP | 7-189713 | 7/1995 |
| JP | 7-247847 | 9/1995 |
| JP | 7-293260 | 11/1995 |
| JP | 8-200137 | 8/1996 |
| JP | 10-317979 | 2/1998 |
| JP | 11-002158 | 1/1999 |
| JP | 11-148429 | 6/1999 |
| JP | 11-324765 | 11/1999 |
| JP | 11-343854 | 12/1999 |
| JP | 2000-045781 | 2/2000 |
| WO | 95/22687 | 8/1995 |

* cited by examiner (a)

(b)

30     EGR rate 38[%]

DIRECT INJECTION TYPE INTERNAL COMBUSTION ENGINE

TECHNICAL FIELD

The present invention relates to a direct-injection internal combustion engine wherein a fuel is injected into a combustion chamber, and more particularly to techniques for stratifying an intake gas charge within the combustion chamber.

BACKGROUND ART

First Prior Art (JP-A-11-148429)

This prior art proposes a technique for stratifying an intake gas charge within a combustion chamber of a direct-injection type compression-ignition internal combustion engine provided with an exhaust gas recirculating (EGR) device, so that the amounts of harmful substances left in the exhaust gas are reduced by the stratification of the intake gas charge.

The combustion chamber is provided with two intake ports through which respective swirl flows are formed concentrically with each other in the same direction. The intake port located upstream of the swirl flows is provided to form the swirl flow of a small diameter in a central portion of the combustion chamber, while the intake port located downstream of the swirl flows is provided to form the swirl flow of a large diameter in a peripheral portion of the combustion chamber.

A recirculated exhaust gas is mixed with the intake gas flowing through the upstream intake port, but is not mixed with the intake gas flowing through the downstream intake port, so that the intake gas existing in a cylindrical region in the central portion of the combustion chamber contains the recirculated exhaust gas, while the intake gas existing in an annular region in the peripheral portion of the combustion chamber does not contain the recirculated exhaust gas.

This prior art says that the swirl flows of small and large diameters are formed in the respective radially inner and outer portions of the combustion chamber. The swirl flow, however, has a centrifugal force increasing its diameter. The swirl flow of the small diameter expands radially outwardly due to a centrifugal force thereof, with an increase of its diameter, and eventually collides and mixes with the swirl flow of the large diameter an increase of which is prevented by the cylindrical wall of the combustion chamber. Accordingly, it is difficult to stratify the intake gas charge within the combustion chamber such that the intake gas containing the recirculated exhaust gas exists in the central cylindrical region while the intake gas not containing the recirculated exhaust gas exists in the peripheral annular region.

Even if the swirl flows of small and large diameters are formed in the respective radially inner and outer portions of the combustion chamber in the intake stroke, there arises a squish flow of the intake gas from a squish area over a peripheral portion of the top face of the piston into a cavity in a central portion of the top face of the piston, in the subsequent compression stroke. The swirl flow of the large diameter in the peripheral portion of the combustion chamber is brought by the squish flow into the central portion of the combustion chamber, and collides and mixes with the swirl flow of the small diameter in the central portion of the combustion chamber. Therefore, it is difficult to maintain, up to a point of time near a terminal period of the compression stroke, the radially stratified state which has been established in the intake stroke and in which the intake gas charge consists of the inner cylindrical swirl flow and the outer annular swirl flow.

Thus, the present prior art arrangement does not assure that at a point of time near the terminal period of the compression stroke at which the combustion of the fuel injected into the combustion chamber is initiated, the central cylindrical region and the peripheral annular region of the combustion chamber are respectively charged with the intake gas containing the recirculated exhaust gas and the intake gas not containing the recirculated exhaust gas, or the intake gases having high and low concentration values of the recirculated exhaust gases, namely, the two intake gases of different compositions. It is not clear whether the amounts of harmful substances left in the exhaust gas are reduced.

The combustion of the fuel within the combustion chamber cannot be controlled as desired, unless the intake gas charge within the combustion chamber is stratified as needed, at the time of initiation of the fuel combustion.

Second Prior Art (FIG. 16)

A direct-injection type internal combustion engine of premixing type has an ordinary fuel injector 2 disposed in a center portion of the top surface of a combustion chamber 1, and a plurality of premixing fuel injector 31 which are disposed at respective positions in a peripheral portion of the top surface of the combustion chamber 1 and each of which is arranged to inject a fuel in a direction that is slightly inclined downwards with respect to the top surface of the combustion chamber. The plurality of premixing fuel injectors 31 are operated at a premixing fuel-injection timing before 30° BTDC during the intake stroke or compression stroke, to inject a portion of a required amount of fuel. And the ordinary fuel injector 2 is operated to inject the remaining portion of the required amount of fuel, at a normal fuel-injection timing during the terminal period of the compression stroke.

This prior art makes it possible to reduce the amount of a portion of the fuel injected from the premixing fuel injectors 31 at the premixing fuel-injection timing, which portion adheres to the wall surfaces of the cavity of the combustion chamber 1. It is therefore possible to reduce the amounts of production of HC (hydrocarbon), SOF (soluble organic fraction) and white smoke due to quenching near the wall surfaces of the cavity.

Although the amount of HC and the like to be produced due to the adhesion of the premixing fuel to the wall surfaces of the cavity of the combustion chamber is reduced, the amount of HC and the like to be produced due to the fuel existing in the squish area of the combustion chamber is not reduced. Thus, the present prior art is not so effective to reduce the amount of HC and the like left in the exhaust gas.

The present prior art requires a plurality of premixing fuel injectors to be disposed in the peripheral portion of the top surface of the combustion chamber, in addition to the ordinary fuel injector disposed in the center portion of the top surface. Accordingly, the construction of the engine is complicated.

Third Prior Art (JP-B-2906932)

A lean-burn type spark-ignition internal combustion engine uses a plurality of intake ports through which two or three tumbling flows of intake gas are formed in the same direction, in respective right and left portions or respective right, left and central portions of the combustion chamber, during the intake stroke. A fuel is injected into only the intake port for forming the tumbling flow that passes a spark plug disposed on the top surface of the combustion chamber.

In this prior art, the tumbling flow of the intake gas containing the fuel does not pass the entirety of the squish area of the combustion chamber, but passes only a portion of the squish area, so that the amount of the fuel existing in the squish area of the combustion chamber is reduced, whereby the amount of production of HC and the like due to quenching in the squish area is reduced.

Although the fuel does not exist in a portion of the squish area that the tumbling flow of the intake gas not containing the fuel passes, the fuel exists in a portion of the squish area that the tumbling flow of the intake gas containing the fuel passes. In this respect, the present prior art is not effective enough to reduce the amount of the fuel existing in the squish area of the combustion chamber, and is therefore not effective enough to reduce the amount of production of HC and the like due to quenching in the squish area.

DISCLOSURE OF THE INVENTION

Study Relating to Stratification of Intake Gas Charge within Combustion Chamber

1) In a direct-injection type compression-ignition internal combustion engine, a jet of a fuel injected from the fuel injector into the intake air within the combustion chamber in the intake stroke causes an air surrounding a root portion, that is, the fuel injector side portion of the fuel jet, to be partly entrained within the interior of the fuel jet and partly carried with the exterior of the fuel jet, whereby an air flow accompanying the fuel jet is induced.

The fuel jet injected into the intake air within the combustion chamber flies at a high velocity, and breaks up into fine droplets, which are eventually vaporized and burned at the end portion of the fuel jet, to generate a flame. While the fuel jet may be burned to generate a flame at the root portion, the fuel jet is burned to generate a high-temperature flame on a large scale at the end portion.

While the fuel is injected and burned, there is formed in the combustion chamber a fuel-air-mixture forming region near the root portion of the fuel jet, in which a fuel-air mixture is formed by mixing the fuel and air. There is also formed in the combustion chamber a flame-generating region near the end portion of the fuel jet, in which the fuel is vigorously burned to generate a high-temperature flame on a large scale. Thus, the interior of the combustion chamber is roughly divided into the fuel-air-mixture forming region and the flame-generating region.

The composition of the fuel-air mixture formed in the fuel-air-mixture forming region of the combustion chamber is influenced by the composition of the intake gas existing in the fuel-air-mixture forming region upon injection of the fuel or upon initiation of the fuel combustion.

The fuel-air mixture formed in the fuel-air-mixture forming region of the combustion chamber is carried by the fuel jet or fuel-air mixture stream into the flame-generating region of the combustion chamber. In the flame-generating region, there exist the fuel-air mixture newly carried from the fuel-air-mixture forming region, and the intake air which has been present in the flame-generating region since a point before the initiation of the fuel combustion, and the burnt gas generated as a result of burning of the fuel in the flame-generating region. The combustion of the fuel in the flame-generating region occurs in the presence of those fuel-air mixture, intake air and burnt gas. The state of combustion of the fuel in the combustion chamber is influenced by the composition of the gas existing in the flame-generating region upon initiation of the fuel combustion.

In other words, the state of the fuel combustion within the combustion chamber can be controlled as desired, by controlling the composition of the gas existing in the fuel-air-mixture forming region upon injection of the fuel or upon initiation of the fuel combustion so that the composition is suitable for creating the desired fuel-air mixture, and by controlling the composition of the gas existing in the flame-generating region upon initiation of the fuel combustion so that the composition of this gas is suitable for establishing the desired fuel combustion state.

Namely, the fuel combustion state within the combustion chamber can be controlled by stratifying the intake gas charge within the combustion chamber such that the charge consists of the intake gas existing in the fuel-air-mixture forming region and the intake gas existing in the flame-generating region.

2) A distance from the nozzle holes of the fuel injector to a position at which the breakup of the fuel jet into fine droplets is initiated will be referred to as "a spray breakup length" of the fuel jet. The position at which the generation of a high-temperature flame on a large scale is initiated at the end portion of the fuel jet is spaced from the position of the nozzle holes of the fuel injector, by a distance which is 1–1.5 times the spray breakup length, which is equal to 15.8 (fuel density/air density)$^{1/2}$·(diameter of nozzle hole of fuel injector).

The fuel injector has a multiplicity of nozzle holes disposed in a center portion of the top surface of the combustion chamber, which is opposed to the top face of the piston. The fuel is injected from these multiple nozzle holes in respective multiple radial directions, which are inclined relative to the nominal radial direction of the combustion chamber, toward the top face of the piston, so that the fuel is injected toward a peripheral part of a cavity formed in a center portion of the top face of the piston, at a point of time near the terminal period of the compression stroke.

Accordingly, the flame-generating region of the combustion chamber is an outside region and is spaced from the position of the nozzle holes of the fuel injector in each fuel injecting radial direction, by a distance not smaller than 1–1.5 times the spray breakup length of the fuel jet, and is substantially symmetrical with respect to the center axis of the combustion chamber. The fuel-air-mixture forming region is an inside region and is spaced from the position of the nozzle holes in each fuel injecting radial direction, by a distance not larger than 1–1.5 times the spray breakup length, and is substantially symmetrical with respect to the center axis of the combustion chamber.

It will be understood from the above analysis as follows. If the intake gas charge within the combustion chamber can be stratified, at a point of time near the terminal period of the compression stroke, so as to exist in two regions that are respectively located inside and outside a generally hemispherical or generally flat hemispherical plane which has its center at the center portion of the top surface of the combustion chamber from which the fuel is injected, the state of combustion of the fuel can be controlled by establishing the desired compositions of the two intake gases existing respectively in the inside and outside regions.

3) The intake gas charge within the combustion chamber can be stratified, in a direct-injection type compression-ignition internal combustion engine which has a plurality of intake ports provided to form a plurality of swirl flows of intake gases in the same direction in the combustion chamber, and which is arranged to inject a fuel from a center portion of the top surface of the combustion chamber, toward the peripheral part of a cavity formed in a center portion of the top face of the piston. The intake gas charge can be stratified by an intake stratifying device, which includes the configurations of the combustion chamber and the intake ports, which are suitably determined so as to establish desired dynamic characteristics of a squish flow and the swirl flows of the intake gases, as described below.

In the intake stroke, an intake port 3 located downstream of the swirl flows is arranged to form a swirl flow of a first intake gas 11 in an upper portion of the combustion chamber 1, along its cylindrical wall, while an intake port 4 located upstream of the swirl flows is arranged to form a swirl flow of a second intake gas 12 in a lower portion of the combustion chamber 1, along the cylindrical wall, as shown in FIG. 2. A state of the vertically stratified intake gas charge consisting of the swirl flows of the first and second intake gases 11, 12 of different compositions, as illustrated in FIGS. 4 and 5 by way of example, is maintained within the combustion chamber 1 up to a point of time within an intermediate period of the compression stroke.

In a latter half of the compression stroke in which a squish flow is created, the swirl flow on the peripheral portion of the top face of the piston is brought by the squish flow into the cavity in the central portion of the piston top face. In the presence of a centrifugal force produced by an increase of the velocity in the direction of the swirl flow with a decrease of the diameter of the swirl flow, the swirl flow is prevented from being directed to the central part of the cavity, but the swirl flow is caused to flow along the peripheral wall of the cavity and is directed toward the bottom surface of the cavity. Before the squish flow is created, the second intake gas exists in the entire portion of the cavity. After the squish flow is creased, the first intake gas 11 flows into the central region of the cavity, and the second intake gas 12 eventually exists in only the peripheral and bottom regions of the cavity, as indicated in FIGS. 6(*a*), 6(*b*) and 6(*c*) in the order of time elapse.

At a point of time near the terminal period of the compression stroke at which the combustion of the fuel is initiated, the first intake gas 11 primarily exists inside the generally flat hemispherical plane 13 which has its center at the center position of the top surface of the combustion chamber 1 from which the fuel is injected, while the second intake gas 12 primarily exists outside the generally flat hemispherical plane 13, as shown in FIG. 1. The intake gas charge within the combustion chamber 1 is stratified such that the intake gases 11, 12 of different compositions are inside and outside the generally flat hemispherical plane 13 at time of initiation of the fuel combustion.

3–1) When the recirculated exhaust gas is not mixed with the first intake gas 11 while the recirculated exhaust gas is mixed with the second intake gas 12, the intake gas charge within the combustion chamber 1 upon initiation of the fuel combustion is stratified such that the intake gas not containing the recirculated exhaust gas or having a low concentration of the recirculated exhaust gas exists in a region inside the generally hemispherical or generally flat hemispherical plane 13 having its center at the position of the fuel injection, while the intake gas containing the recirculated exhaust gas or having a high concentration of the recirculated exhaust gas exists in a region outside the generally hemispherical or generally flat hemispherical plane 13.

In the reverse case, that is, when the recirculated exhaust gas is mixed with the first intake gas 11 while the recirculated exhaust gas is not mixed with the second intake gas 12, the intake gas charge within the combustion chamber 1 upon initiation of the fuel combustion is stratified such that the intake gas containing the recirculated exhaust gas or having a high concentration of the recirculated exhaust gas exists in the region inside the generally hemispherical or generally flat hemispherical plane 13 having its center at the position of the fuel injection, while the intake gas not containing the recirculated exhaust gas or having a low concentration of the recirculated exhaust gas exists in the region outside the generally hemispherical or generally flat hemispherical plane 13.

3–2) The stratification pattern of the intake gas charge within the combustion chamber 1 is changed by mixing a specific component such as the recirculated exhaust gas and the fuel with the first intake gas 11 and the second intake gas 12, and by increasing or reducing the amounts of the specific component to be mixed with the first intake gas 11 and the second intake gas 12. Namely, the stratification pattern can be changed to one of: a normal stratification pattern in which the concentration of the specific component in the region of the combustion chamber 1 inside the generally flat hemispherical plane 13 is lower than that in the region outside the generally flat hemispherical plane 13; a reverse stratification pattern in which the concentration of the specific component in the region of the combustion chamber 1 inside the generally flat hemispherical plane 13 is higher than that in the region outside the generally flat hemispherical plane 13; and a homogeneous pattern in which the concentrations of the specific component in the regions of the combustion chamber 1 inside and outside the generally flat hemispherical plane 13 are equal to each other.

By increasing or reducing the amounts of the specific component to be mixed with the first intake gas 11 and the second intake gas 12, the degree of the stratification of the intake gas charge within the combustion chamber 1 can be changed. The degree of the stratification, that is, the ratio of the concentration of the specific component outside the generally flat hemispherical plane 13 to the concentration the specific component inside the generally flat hemispherical plane 13, is increased and reduced.

Study Relating to Stratification of Intake Gas Charge Containing Recirculated Exhaust Gas 4) According to a study by the present inventors on a direct-injection type compression-ignition internal combustion engine, a high-temperature region in which the fuel jet injected by the fuel injector is burned is formed in the squish area and the peripheral part of the cavity, as shown in FIGS. 11(*a*) and 12(*a*) by way of example.

In this high-temperature burning region, NOx (nitrogen oxides) is produced in a fuel-lean area in which the fuel-air ratio is in the neighborhood of the stoichiometric value, as shown in FIGS. 11(*b*), 11(*c*), 12(*b*) and 12(*c*) by way of example. When the squish area and the peripheral part of the cavity of the combustion chamber are charged with the intake gas containing the recirculated exhaust gas, during the fuel combustion period, the oxygen concentration and the combustion temperature in the high-temperature burning region are lowered, with a result of reduction of the amount of production of NOx.

As shown in FIGS. 11(*b*), 11(*d*), 12(*b*) and 12(*d*) by way of example, soot is produced in a fuel-rich area or oxygen-lean burning area of the high-temperature burning region, in which the fuel-air ratio is lower than the stoichiometric value, that is, in the end portion of the jet of the fuel injected by the fuel injector, or in the recessed portion of the cavity. To reduce the amount of production of the soot, it is effective to supply oxygen to the end portion of the fuel jet in which the fuel combustion takes place with a shortage of oxygen, that is, to eliminate the shortage of oxygen in the end of the fuel jet. When a circumference of the root portion of the fuel jet injected from the fuel injector is not supplied with the recirculated exhaust gas but is supplied with fresh air during the fuel combustion period, the fresh air is carried or fed by the fuel jet or fuel-air mixture stream to the end portion of the fuel jet or the recessed portion of the cavity in which the fuel combustion takes place with a shortage of oxygen, so that the amount of production of the soot is reduced. At this time, however, an increase of NOx is prevented by controlling the oxygen concentration so as to prevent its increase to a level of production of NOx.

Accordingly, the amounts of production of NOx and soot can be both reduced by stratifying the intake gas charge within the combustion chamber upon initiation of the fuel combustion such that the intake gas not containing the recirculated exhaust gas or having a low concentration of the recirculated exhaust gas exists in the fuel-air-mixture forming region including the root portion of the fuel jet injected from the fuel injector, while the intake gas containing the recirculated exhaust gas or having a high concentration of the recirculated exhaust gas exists in the flame-generating region located outside the fuel-air-mixture forming region.

5) When the internal combustion engine is operated under a high load and the timing of the fuel injection is late, or when the engine is operated at a high speed and a strong reverse squish flow is created, the amount of the fuel flowing out of the cavity in the combustion chamber tends to increase, so that the fuel combustion outside the cavity takes place with a shortage of oxygen, while the fuel combustion within the cavity takes place with an excessive amount of oxygen. In this case, the soot is produced primarily outside the cavity, while the NOx is produced primarily within the cavity.

In the above case, the normal stratification pattern within the combustion chamber is changed to the reverse stratification pattern in which the intake gas containing the recirculated exhaust gas or having a high concentration of the recirculated exhaust gas exists in the central portion of the combustion chamber including the position of the fuel injection, while the intake gas not containing the recirculated exhaust gas or having a low concentration of the recirculated exhaust gas exists in the outer peripheral portion of the combustion chamber. In the reverse stratification pattern, the oxygen concentration is increased outside the cavity and in the squish area of the combustion chamber, so that not only the amount of production of the soot is reduced, but also oxidization of the soot is promoted, reducing the amount of the soot. At this time, however, an increase of NOx is prevented by controlling the oxygen concentration so as to prevent its increase to a level of production of NOx.

The amounts of production of NOx and soot can be effectively reduced by controlling the stratification pattern of the intake gas charge within the combustion chamber 1, depending upon the operating conditions of the internal combustion engine.

6) When the intake gas containing the recirculated exhaust gas or a high concentration of the recirculated exhaust gas exists in the region outside the generally hemispherical or generally flat hemispherical plane having its center at the position of the fuel injection, the radius of the generally hemispherical or generally flat hemispherical plane increases with an increase in the concentration of the recirculated exhaust gas outside the generally hemispherical or generally flat hemispherical plane, where the amount of the recirculated exhaust gas contained in the intake gas is held constant.

When the area of production of NOx is wide enough to cover a part of the region inside the generally hemispherical or generally flat hemispherical plane, the amount of production of NOx can reduced over the wide area, by reducing the concentration of the recirculated exhaust gas outside the generally hemispherical or generally flat hemispherical plane, to thereby reduce the radius of the generally hemispherical or generally flat hemispherical plane. When the area of production of NOx is narrow, on the other hand, the amount of production of NOx can be reduced with an increase in the concentration of the recirculated exhaust gas, by increasing the concentration outside the generally hemispherical or generally flat hemispherical plane, to thereby increase the radius of the generally hemispherical or generally flat hemispherical plane.

Thus, the amounts of production of NOx and soot can be more effectively reduced by changing the concentration of the recirculated exhaust gas inside or outside the generally hemispherical or generally flat hemispherical plane, depending upon the area of production of NOx, that is, the operating conditions of the internal combustion engine.

Study Relating to Stratification of Intake Gas Charge Containing Fuel

7) In the internal combustion engines according to the second and third prior arts, the amounts of harmful substances such as HC, SOF and white smoke left in the exhaust gas cannot be sufficiently reduced, in the presence of the fuel in the squish area and near the wall surfaces of the cavity of the combustion chamber, which tend to easily suffer from a temperature drop and quenching. It was found effective to stratify the intake gas charge within the combustion chamber upon initiation of the fuel combustion such that the intake gas not containing the fuel or having a low concentration of the fuel gas exists in the squish area and near the wall surfaces of the cavity in the peripheral portion of the combustion chamber, while the intake gas containing the fuel or having a high concentration of the fuel exists in the central portion of the combustion chamber.

The thus stratified intake gas charge prevents the presence of the fuel, or reduces the amount of the fuel, in the squish area and near the wall surfaces of the cavity of the combustion chamber, upon initiation of the fuel combustion, so that the amount of the fuel present in the region which tends to easily suffer from quenching is reduced. Further, the above-indicated stratification permits the fuel combustion primarily in the central portion of the combustion chamber, making it possible to increase the fuel combustion temperature and consequently reduce the non-combustion ratio of the fuel. As a result, the amounts of the harmful substances such as HC, SOF and white smoke left in the exhaust gas are more effectively reduced.

8) An internal combustion engine has a characteristic that the temperatures in the central and peripheral portions of the combustion chamber are both higher when the load on the internal combustion engine is high than when the load is low. When the load is high, a ratio of the fuel mixing ratio of the intake gas existing upon initiation of the fuel combustion in the peripheral portion of the combustion chamber to that of the intake gas existing in the central portion of the combustion chamber, which central portion includes the center portion of the top surface of the combustion chamber, is made higher than when the load is low. As a result, the fuel concentration in the central portion of the combustion chamber is reduced, preventing an excessive rise of the combustion temperature and thereby reducing the amount of increase of NOx. In the peripheral portion of the combustion chamber, on the other hand, the fuel concentration is high, but an increase of the amount of HC is prevented owing to a high temperature in the peripheral portion. Rather, a ratio of the fuel to the oxygen is increased in the peripheral portion, so that the oxygen can be effectively utilized.

The amounts of the harmful substances left in the exhaust gas can be more effectively reduced by controlling the ratio of the fuel concentration of the intake gas existing upon initiation of the fuel combustion in the peripheral portion of the combustion chamber to that in the central portion of the combustion chamber including the center portion of the top surface of the combustion chamber, depending upon the operating conditions of the internal combustion engine.

SUMMARY OF THE INVENTION

Stratification of Intake Gas Charge within Combustion Chamber

1) A method of stratifying an intake gas charge within a combustion chamber of a direct-injection type internal combustion engine wherein a fuel is injected into the combustion chamber, wherein the intake gas charge is stratified such that intake gases of different compositions exist in a central portion of the combustion chamber including a position of injection of the fuel, and in a peripheral portion of the combustion chamber, upon initiation of combustion of the fuel at a point of time near a terminal period of a compression stroke.

The "intake gases of different compositions" may be "intake gases having different concentrations of a specific component contained therein such as a recirculated gas and a fuel", for instance.

2) A method according to the above stratifying method, wherein a pattern of stratification of the intake gas charge within the combustion chamber is changed depending upon operating conditions of the internal combustion engine, to a selected one of: a normal stratification pattern in which the concentration of the specific component of the intake gas in the central portion is lower than that of the intake gas in the peripheral portion; a reverse stratification pattern in which the concentration of the specific component of the intake gas in the central portion is higher than that of the intake gas in the peripheral portion; and a homogeneous pattern in which the concentration of the specific component of the intake gas in the central portion is equal to that of the intake gas in the peripheral portion.

3) A method according to the above stratifying method, wherein a degree of the stratification, that is, a ratio of the concentration of the specific component of the intake gas in the peripheral portion to that of the intake gas in the central portion is changed depending upon operating conditions of the internal combustion engine.

4) A device for stratifying an intake gas charge within a combustion chamber of a direct-injection type internal combustion engine in which a plurality of intake ports are provided to form a plurality of swirl flows of intake gases in a same direction in the combustion chamber and in which a fuel is injected into the combustion chamber, from a center portion of a top surface of the combustion chamber opposed to a top face of a piston, toward a peripheral part of a cavity formed in a central portion of the top face of the piston, the device including:

an arrangement for forming, in an intake stroke, a swirl flow of a first intake gas in an upper portion of the combustion chamber, along a cylindrical wall of the combustion chamber, and a swirl flow of a second intake gas in a lower portion of the combustion chamber, along the cylindrical wall of the combustion chamber, and for maintaining a state of vertical stratification of the intake gas charge consisting of the swirl flows of the first and second intake gases within the combustion chamber, up to a point of time within an intermediate period of a compression stroke;

an arrangement for causing the first intake gas to flow into a central region of the cavity in the central portion of the top face of the piston, while the second intake gas remains in a peripheral region and a bottom region of the cavity, in a latter half of a compression stroke in which a squish flow is created; and an arrangement for stratifying the intake gas charge within the combustion chamber at a point of time near a terminal period of the compression stroke in which the combustion of the fuel is initiated, such that the first intake gas exists primarily in a region inside a generally hemispherical or generally flat hemispherical plane having its center at a position of injection of the fuel into the combustion chamber, while the second intake gas exists primarily in a region outside the generally hemispherical or generally flat hemispherical plane.

5) A device according to the above stratifying device, wherein the generally hemispherical or generally flat hemispherical plane is spaced from the position of injection of the fuel into the combustion chamber, in a direction of injection of the fuel, by a distance 1–1.5 times a spray breakup length of the injected fuel.

Stratification of Intake Gas Charge Containing Recirculated Exhaust Gas

6) A direct-injection type internal combustion engine wherein a fuel is injected into a combustion chamber, and an intake gas not containing a recirculated exhaust gas or having a low concentration of the recirculated exhaust gas exists in one of a central portion of the combustion chamber including a position of injection of the fuel and a peripheral portion of the combustion chamber, while an intake gas containing the recirculated exhaust gas or having a high concentration of the recirculated exhaust gas exists in the other of the central and peripheral portions of the combustion chamber, upon initiation of combustion of the fuel at a point of time near a terminal period of a compression stroke.

7) A direct-injection type internal combustion engine according to the above internal combustion engine, wherein the intake gas containing the recirculated exhaust gas or having the high concentration of the recirculated exhaust gas exists in the central portion of the combustion chamber, while the intake gas not containing or having the low concentration of the recirculated exhaust gas exists in the peripheral portion, upon initiation of combustion of the fuel at the point of time near the terminal period of the compression stroke, when the internal combustion engine is operated under a high load or at a high speed.

8) A direct-injection type internal combustion engine according to the above internal combustion engine, wherein a ratio of the concentration of the recirculated exhaust gas in the peripheral portion to the concentration of the recirculated exhaust gas in the central portion is changed depending upon operating conditions of the internal combustion engine.

Stratification of Intake Gas Charge Containing Fuel

9) A direct-injection type internal combustion engine of compression-ignition or spark-ignition type in which a fuel is injected into an intake gas within a combustion chamber or to the intake gas within the combustion chamber and an intake gas within an intake passage and in which combustion of the fuel is initiated at a point of time near a terminal period of a compression stroke, the direct-injection type internal combustion engine including:

an arrangement for stratifying an intake gas charge within the combustion chamber such that an intake gas containing a fuel or having a high concentration of the fuel exists in a central portion of the combustion chamber including a center portion of a top surface of the combustion chamber, while an intake gas not containing the fuel or having a low concentration of the fuel exists in a squish area and near wall surfaces of a cavity in a peripheral portion of the combustion chamber, upon initiation of combustion of the fuel.

10) A direct-injection type internal combustion engine according to the above internal combustion engine, wherein a ratio of the concentration of the fuel in the intake gas existing upon initiation of combustion of the fuel in the peripheral portion of the combustion chamber, to the concentration of the fuel in the intake gas existing in the central portion of the combustion chamber including the center portion of the top surface is changed depending upon operating conditions of the internal combustion engine.

BEST MODE FOR CARRYING OUT THE INVENTION

First Embodiment (FIGS. 1–8)

Figure 1:
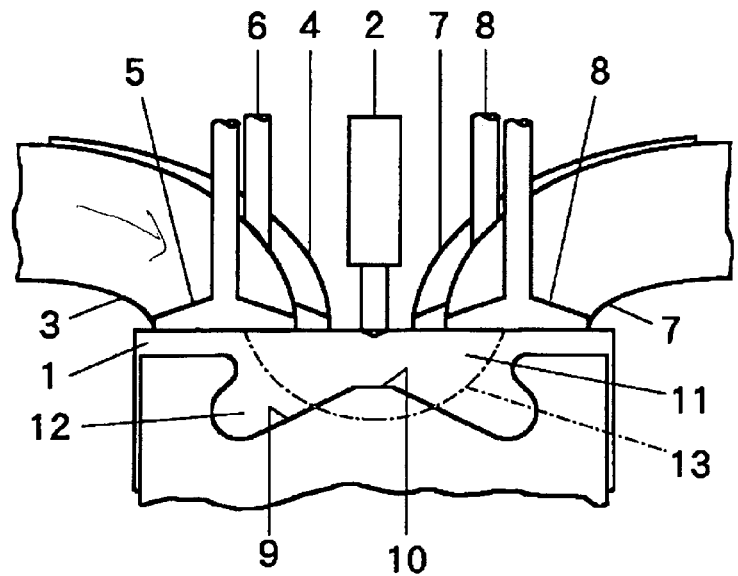
FIG. 1 is a schematic view in vertical cross section of a direct-injection type internal combustion engine provided with an intake stratifying device in a first embodiment of the present invention.

As shown in FIG. 1, the direct-injection type compression-ignition internal combustion engine provided with the intake stratifying device according to the present embodiment includes: a fuel injector 2 having a multiplicity of nozzle holes disposed in a center portion of a top surface of a combustion chamber 1; two intake ports 3, 4 and two intake valves 5, 6 which are disposed on one side of the top surface of the combustion chamber 1; and two exhaust ports 7 and two exhaust valves 8 which are disposed on the other side of the top surface. In a central portion of the top face of a piston, there is concentrically formed an asymmetric cavity 9. The cavity 9 has a bottom surface, which includes a central part defining a crest 10, and a peripheral part, which surrounds the crest 10 and partially defines a recessed portion. The fuel injector 2 is arranged to inject a fuel from its multiple nozzle holes in a radial direction into the peripheral part of the cavity 9, at a point of time near a terminal period of the compression stroke.

Figure 2:
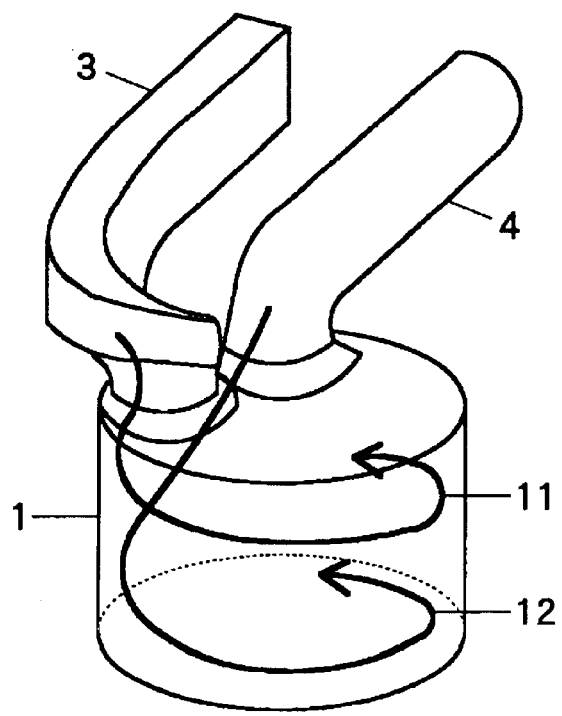
FIG. 2 is a schematic perspective view of a combustion chamber of the internal combustion engine in an intermediate period of its intake stroke.
Figure 3:
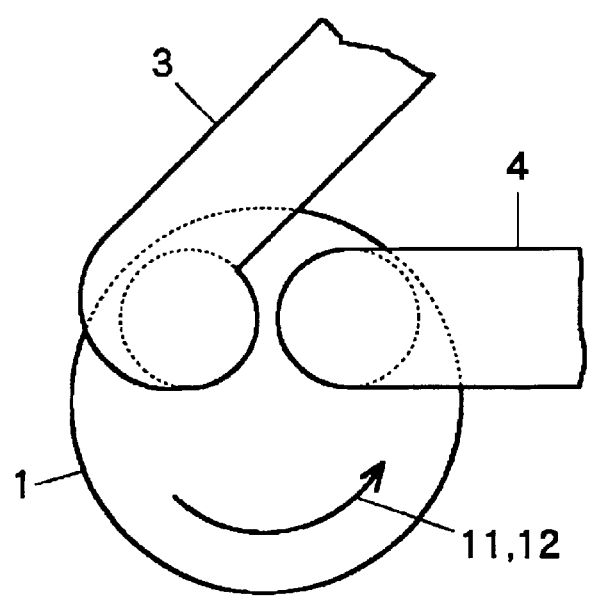
FIG. 3 is a schematic plan view of the combustion chamber of the internal combustion engine.

The two intake ports 3, 4 are provided to form swirl flows 11, 12 of intake gases into the combustion chamber 1 in the same direction of rotation, in an intake stroke, as shown in FIG. 2. As shown in FIGS. 2 and 3, the intake port 3 located downstream of the swirl flows is a helical port shaped to introduce the first intake gas almost along the top surface of the combustion chamber 1 and to form the strong swirl flow 11 in an upper portion of the combustion chamber 1 located on the side of its top surface, and along the cylindrical wall of the combustion chamber 1, while the intake port 4 located upstream of the swirl flows is a tangential port shaped to introduce the second intake gas in an obliquely downward direction, so as to avoid a collision of the second intake gas with the swirl flow 11 of the first intake gas, and to form the swirl flow 12 of the second intake gas in a lower portion of the combustion chamber 1 located on the side of the top face of the piston.

Figure 4:
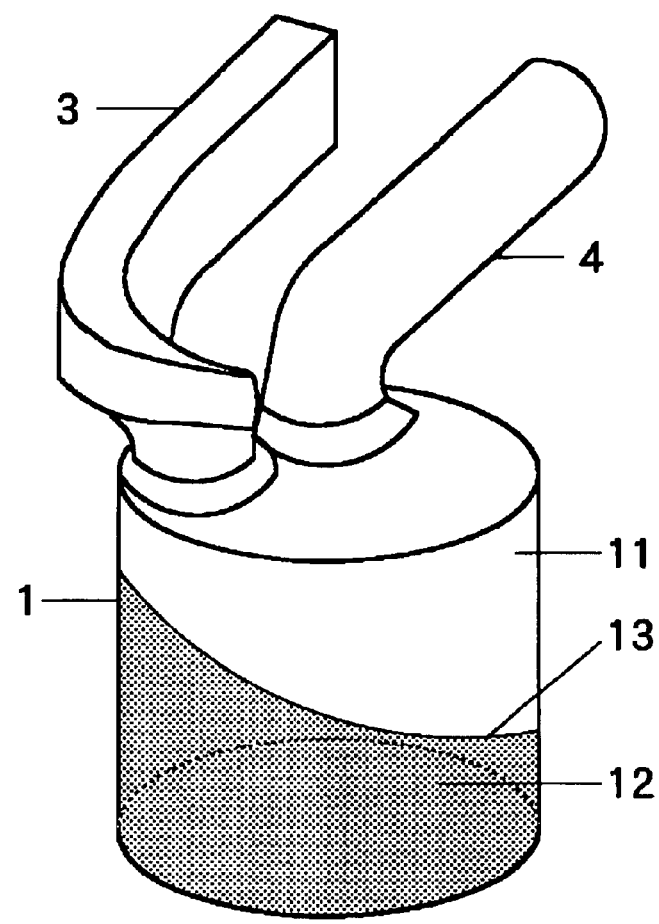
FIG. 4 is a schematic perspective view of the combustion chamber of the internal combustion engine in a terminal period of the intake stroke.

In the intake stratifying device of the present embodiment, the swirl flows 11 and 12 of the respective first and second intake gases are formed both along the cylindrical wall of the combustion chamber 1, in the respective upper and lower portions of the combustion chamber 1, in the intake stroke, as shown in FIG. 2. In a terminal period of the intake stroke, the intake gas charge within the combustion chamber 1 is vertically stratified as the swirl flow 11 of the first intake gas and the swirl flow 12 of the second intake gas, as shown in FIG. 4. In the terminal period of the intake stroke, a trailing part of the second intake gas flow 12 from the upstream intake port 4 exists in the upper portion of the combustion chamber 1, so that an interface 13 between the first intake gas flow 11 and the second intake gas flow 12 is not parallel to the top face of the piston, but is an inclined concave or convex curve.

The first and second intake gas flows 11, 12 within the combustion chamber 1 have different compositions, and mix with each other as the time passes, such that component contained in only one of the flows 11, 12 will be contained also in the other flow 11, 12, so that the concentration of that component within the combustion chamber 1 continuously changes, with almost middle concentration value lying on the interface 13 between the first and second intake gas flows 11, 12.

Figure 5:
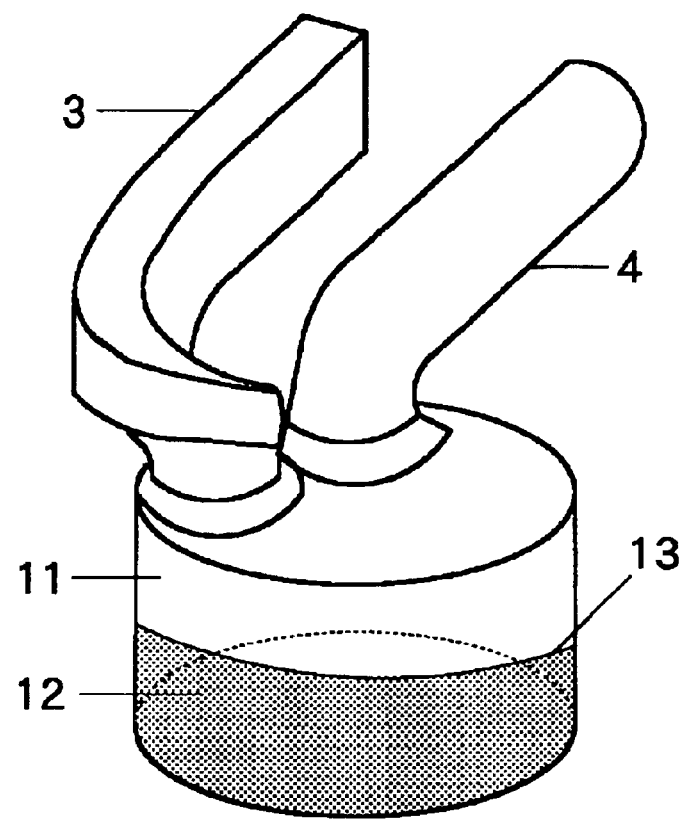
FIG. 5 is a schematic perspective of the combustion chamber of the internal combustion engine in an intermediate period of its compression stroke.
Figure 6:
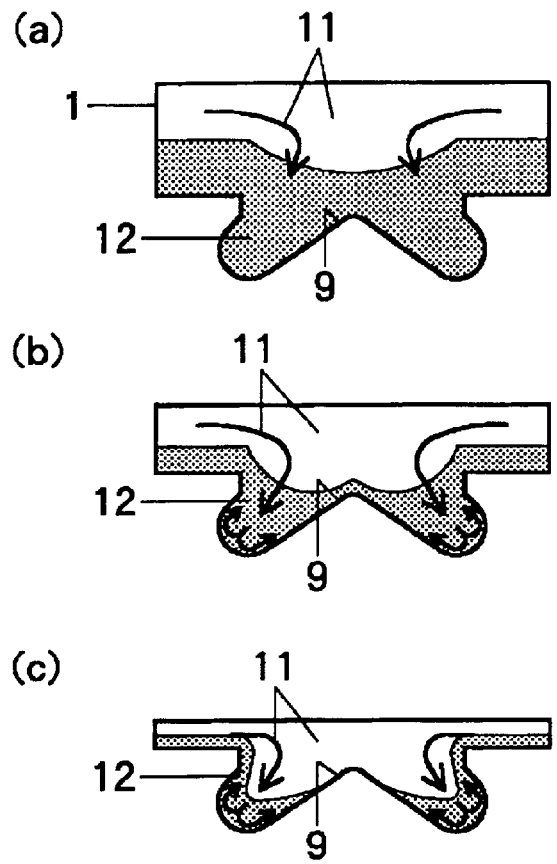
FIGS. 6(a), 6(b) and 6(c) are schematic views in vertical cross section showing flows of intake gases within the combustion chamber of the internal combustion engine at a point near the terminal period of the compression stroke.
Figure 7:
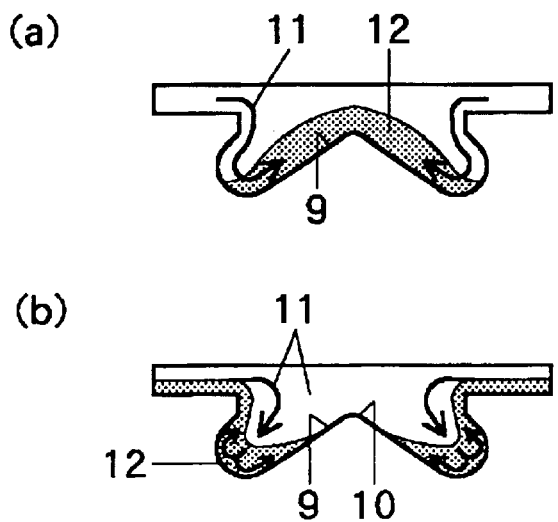
FIGS. 7(a) and 7(b) are schematic views in vertical cross section showing flows of the intake gases within the combustion chamber of the internal combustion engine in the terminal period of the compression stroke.
Figure 8:
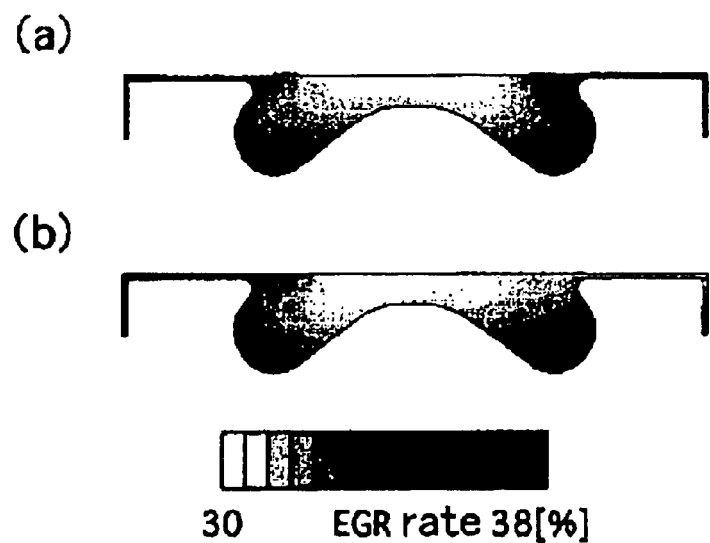
FIGS. 8(a) and 8(b) are schematic views showing stratifying state of the intake gases in the terminal period of the compression stroke in an example of simulation test in the first embodiment of the invention.

When the compression stroke is initiated, the trailing part of the second intake gas flow 12 has moved into the lower portion of the combustion chamber 1 and the mixing of the first and second intake gas flows 11, 12 further proceeds. In an intermediate period of the compression stroke, the interface 13 between the first and second intake gas flows 11, 12 becomes almost parallel to the top face of the piston, as shown in FIG. 5. A state of the vertically stratified intake gas charge consisting of the swirl flows 11, 12 of the first and second intake gases is maintained within the combustion chamber 1 up to a point of time within an intermediate period of the compression stroke.

In a latter half of the compression stroke in which squish flow is created, the swirl flow on the peripheral portion of the top face of the piston is brought by the squish flow into the cavity 9 in the central portion of the piston top face. In the presence of a centrifugal force produced by an increase of the velocity in the direction of the swirl flow with a decrease of the diameter of the swirl flow, the swirl flow is prevented from being directed to the central part of the cavity 9, but the intake gas of the swirl flow is caused to flow along the peripheral wall of the cavity 9 and is directed toward the bottom surface of the cavity 9. As shown in FIGS. 6(a), 6(b) and 6(c) in the order of time elapse, the state of the intake gas charge within the cavity 9 changes from a state in which the cavity 9 is filled with the second intake gas 12 in the lower portion of the combustion chamber 1, to a state in which the second intake gas 12 remains in only the peripheral and bottom regions of the cavity 9, as a result of a flow of the first intake gas 11 from the upper portion of the combustion chamber 1 into the central region of the cavity 9.

At a point of time near the terminal period of the compression stroke at which the combustion of the fuel injected from the fuel injector 2 is initiated, the first intake gas 11 primarily exists inside the generally flat hemispherical plane 13 which has a center in the center portion of the top surface of the combustion chamber 1 from which the fuel is injected, while the second intake gas 12 primarily exists outside the generally flat hemispherical plane 13, as shown in FIG. 1. At the time of initiation of the combustion of the fuel, the intake gas charge within the combustion chamber 1 is stratified such that the intake gases 11, 12 are inside and outside the generally flat hemispherical plane 13.

Where the radius of the above-indicated generally flat hemispherical plane 13 as measured in the direction of injection of the fuel is about 1–1.5 times the spray breakup length of the injected fuel, the intake gas charge within the combustion chamber 1 is stratified as the intake gases 11, 12 existing in a fuel-air-mixture forming region and a flame-generating region of the combustion chamber 1, respectively.

If the swirl flow of the first intake gas 11 is too strong at a point of time near the terminal period of the compression stroke, the first intake gas 11 directed by the squish flow toward the bottom surface of the cavity 9 takes the form of a reverse toroidal flow along the peripheral wall of the cavity 9 in the downward direction to the bottom surface, while displacing the second intake gas 12 which has existed along the peripheral wall and bottom surface of the cavity 9, so that the second intake gas 12 is eventually forced into the central part of the cavity 9, as shown in FIG. 7(a).

In the present embodiment in which the swirl flows of the intake gases 11, 12 and the squish flow are optimally adjusted, the first intake gas 11 takes the form of a toroidal flow along an intermediate portion between the crest 10 and the peripheral wall of the cavity 9 in the downward direction, so that the second intake gas 12 which has existed along the above-indicated intermediate portion is forced into the peripheral and bottom regions of the cavity 9, whereby the intake gas charge is stratified as the intake gases 11, 12 existing in the inside and outside the substantially flat hemispherical plane 13 the center of which is located at the position of the fuel injection into the combustion chamber 1.

In the present intake stratifying device, the configurations of the combustion chamber 1 and the intake ports 3, 4 which determine the motion characteristics of the squish flow and swirl flows of the intake gases 11, 12 are determined so as to form the intake gases 11, 12 in a stratified pattern as described above. The degree of the stratification of the intake gases 11, 12 and the shape and dimensions of the interface 13 can be controlled by those configurations.

The above-indicated configurations include the shape of the cavity 9 of the combustion chamber 1, the spacing distance between the peripheral portion of the piston and the peripheral portion of the top surface of the combustion chamber 1, and the amounts of recessing of the lower faces of the intake valves 5, 6 from the top surface of the combustion chamber 1.

Example of Simulation Test

In the present intake stratifying device, the distribution of the concentration of a recirculated exhaust gas within the combustion chamber 1 in the terminal period of the compression stroke was obtained by numerical calculation, where the first intake gas 11 to be introduced into the combustion chamber 1 through the downstream intake port 3 is 100% fresh air, while the second intake gas 12 to be introduced through the upstream intake port 4 consists of 50% of fresh air and 50% of recirculated exhaust gas.

The lightness distribution in FIG. 8(b) indicates a distribution of the concentration of the recirculated exhaust gas (EGR rate) in a central vertical cross sectional plane extending between the downstream and upstream intake ports 3, 4, while that in FIG. 8(a) indicates a distribution of the concentration in a central vertical cross sectional plane perpendicular to that of FIG. 8(b).

It will be understood from FIGS. 8(a) and 8(b) that the concentration of the recirculated exhaust gas within the combustion chamber 1 in the terminal period of the compression stroke has equal-value regions in the form of a generally flat hemispherical plane having its center at the position of the fuel injection, such that the concentration of the recirculated exhaust gas decreases in the direction toward the position of the fuel injection, and the distribution of the concentration is symmetrical with respect to the axis of the combustion chamber 1. This means that the intake gas charge within the combustion chamber 1 is stratified as the intake gases 11, 12 existing inside and outside the generally flat hemispherical plane whose center lies at the position of the fuel injection.

Figure 9:
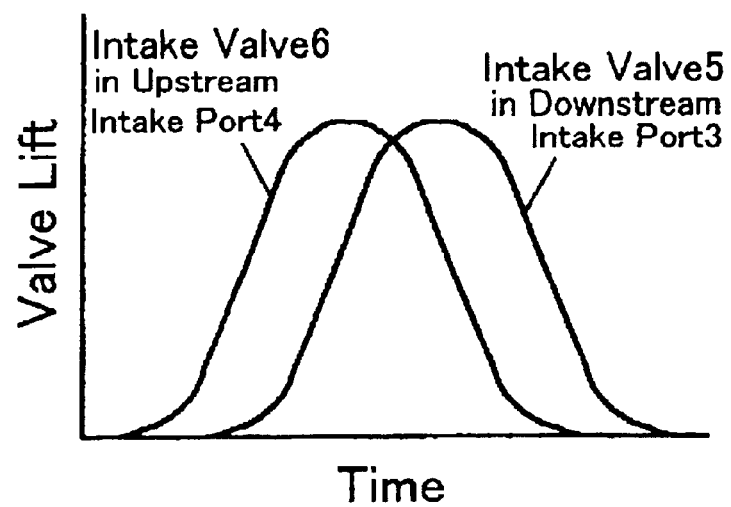
FIG. 9 is a valve lift diagram of intake valves of a direct-injection type internal combustion engine provided with an intake stratifying device in a second embodiment of the invention.

Second Embodiment (FIG. 9)

An intake stratifying device according to the present embodiment is different from that of the first embodiment, in that the intake valves 5, 6 in the respective downstream and upstream intake ports 3, 4 are opened at respective different points of time and held open for respective different periods, for increasing the degree of stratification of the intake gas charge in the present second embodiment.

The moments of opening and closing of the intake valve 5 in the downstream intake port 3 through which the first intake gas 11 is introduced into the upper portion of the combustion chamber 1 are delayed, as indicated in FIG. 9. The intake valve 6 in the upstream intake port 4 through which the second intake gas 12 is introduced into the lower portion of the combustion chamber 1 is opened and closed at points of time before the moments of opening and closing of the intake valve 5.

In an early period of the intake stroke, only the intake valve 6 in the upstream intake port 4 is open so that only the second intake gas 12 is introduced into the lower portion of the combustion chamber 1. In an intermediate period of the intake stroke, the intake valves 5, 6 in the two intake ports 3, 4 are both held open to permit the first and second intake gases 11, 12 to be introduced into the combustion chamber 1. In a terminal period of the intake stroke, only the intake valve 5 in the downstream intake port 3 is open so that only the first intake gas 11 is introduced into the upper portion of the combustion chamber 1.

In the present embodiment, the degree of vertical stratification of the first and second intake gases 11, 12 in the terminal period of the intake stroke is made higher than in the first embodiment in which the intake valves 5, 6 in the downstream and upstream intake ports 3, 4 are held open for the same period of time. Accordingly, the degree of the stratification of the intake gases 11, 12 inside and outside the generally flat hemispherical plane 13 having the center at the position of the fuel injection is increased in the terminal period of the compression stroke.

In the other aspects, the second embodiment is the same as the first embodiment.

Figure 10:
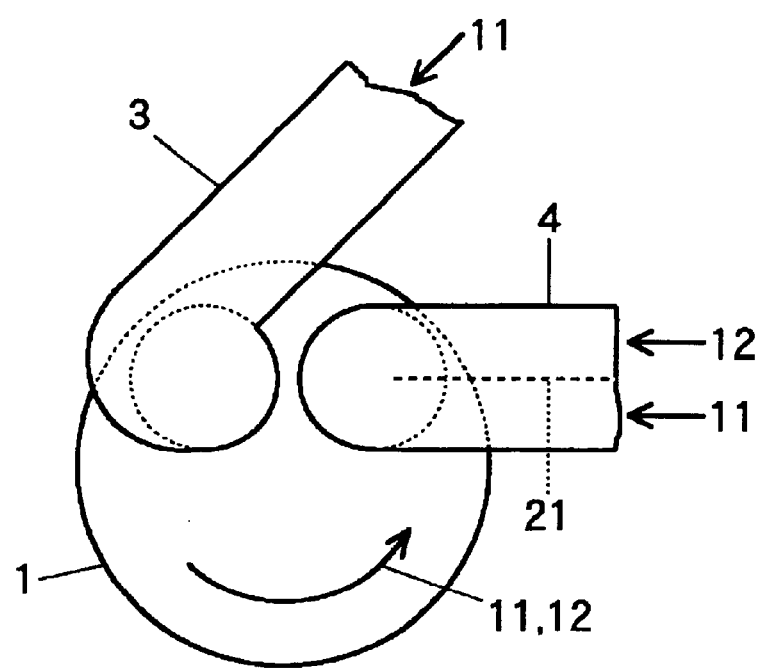
FIG. 10 is a schematic plan view of a combustion chamber of a direct-injection type internal combustion engine provided with an intake stratifying device in a third embodiment of the invention.

Third Embodiment (FIG. 10)

An intake stratifying device according to the present embodiment is different from that of the first embodiment, in that the second intake gas 12 is introduced into the combustion chamber 1 through only one of two halves of the upstream intake port 4, for increasing the degree of stratification of the intake gas charge.

The upstream intake port 4 is arranged to introduce the intake gas in the obliquely downward direction, so that the introduced intake gas obliquely collides with the cylindrical wall of the combustion chamber 1, so as to form the swirl flow along the lower portion of the cylindrical wall of the combustion chamber 1. The intake gas introduced through a wall side portion of the intake port 4 of tangential type, which is a portion on the side of the cylindrical wall of the combustion chamber 1, has a shorter distance of flow for collision with the cylindrical wall, and is more easily introduced into the lower portion of the combustion chamber 1, than that introduced through a center side portion of the intake port 4, which is a portion on the side of the center of the combustion chamber 1.

In view of the above, the upstream intake port 4 is provided with a partition wall 21 for dividing it into two sections, that is, a wall side section and a center side section being respectively on the sides of the cylindrical wall and the center of the combustion chamber 1, as shown in FIG. 10. The second intake gas 12 having a high concentration of a specific component such as the recirculated exhaust gas is introduced through the wall side section of the intake port 4 being on the side of the cylindrical wall of the combustion chamber 1, into the lower portion of the combustion chamber 1. The first intake gas 11 is introduced into the combustion chamber 1 through the center side section of the intake port 4 being on the side of the center of the combustion chamber 1 as introduced through the downstream intake port 3.

The second intake gas 12 introduced into the combustion chamber 1 through the wall side section of the intake port 4 has a relatively narrow stream, which is less likely to mix with the first intake gas 11.

The degree of vertical stratification of the first and second intake gases 11, 12 in the terminal period of the intake stroke is made higher in the present embodiment than in the first embodiment in which the second intake gas 12 is introduced through the entirety of the upstream intake port 4. Accordingly, the degree of the stratification of the intake gases 11, 12 inside and outside the generally flat hemispherical plane 13 having the center at the position of the fuel injection is increased in the terminal period of the compression stroke.

In the other aspects, the third embodiment is the same as the first embodiment.

Fourth Embodiment

An intake stratifying device according to the present embodiment is different from that of the first embodiment, in that the combustion chamber 1 is provided at its lower or upper portion with a sub-port which permits easy introduction of the intake gas, for increasing the degree of stratification of the intake gas charge.

This sub-port is an auxiliary intake port similar to the wall side section of the intake port 4 in the third embodiment, which permits easy introduction of the intake gas into the lower portion of the combustion chamber 1. The second intake gas 12 having a high concentration of the specific component is introduced through the auxiliary intake port into the lower portion of the combustion chamber 1.

Figure 11:
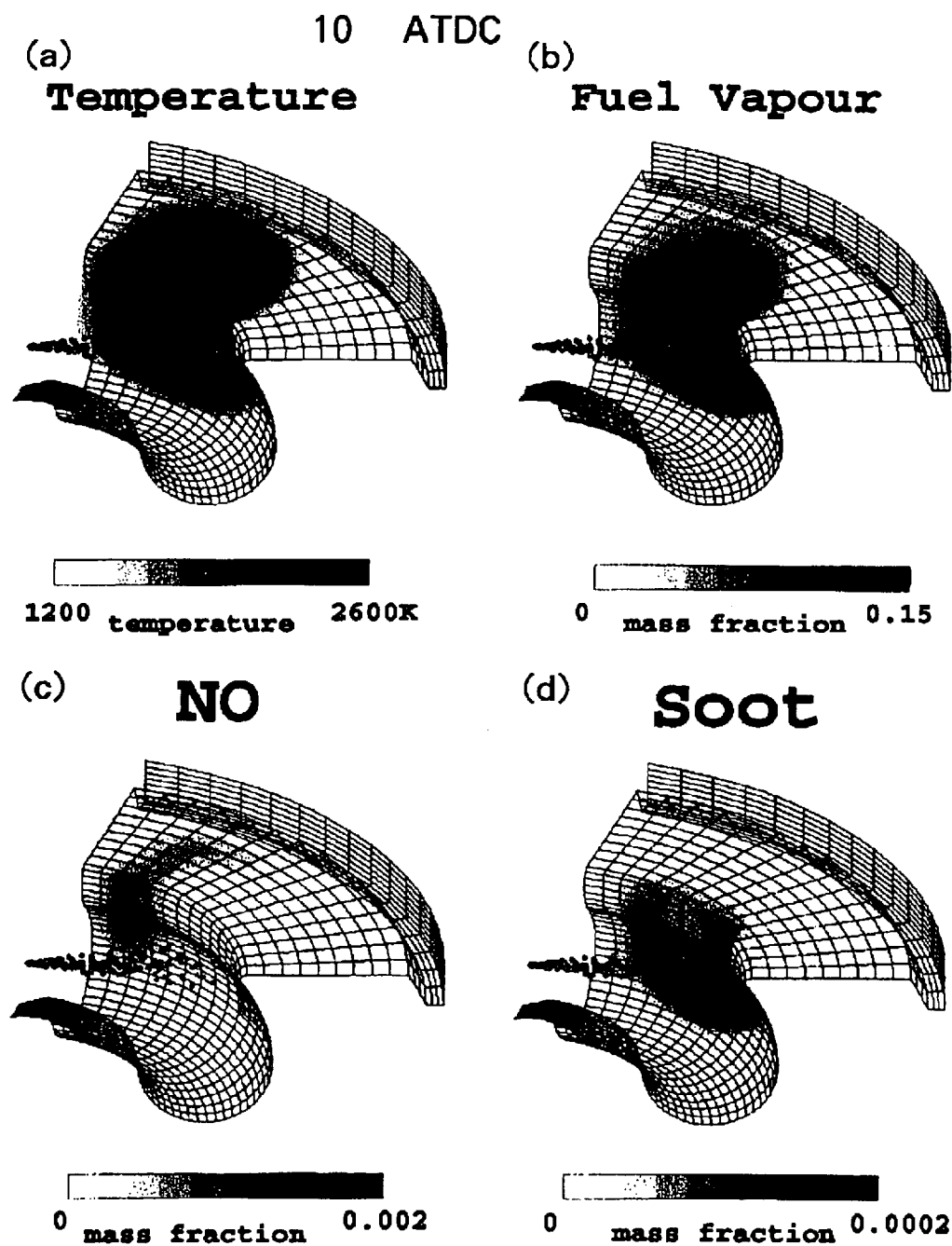
FIGS. 11(a), 11(b), 11(c) and 11(d) are views indicating distributions of the temperature, and amounts of fuel vapor, NO and soot, with 10° ATDC in an example of simulation test in a fifth embodiment of the invention.
Figure 12:
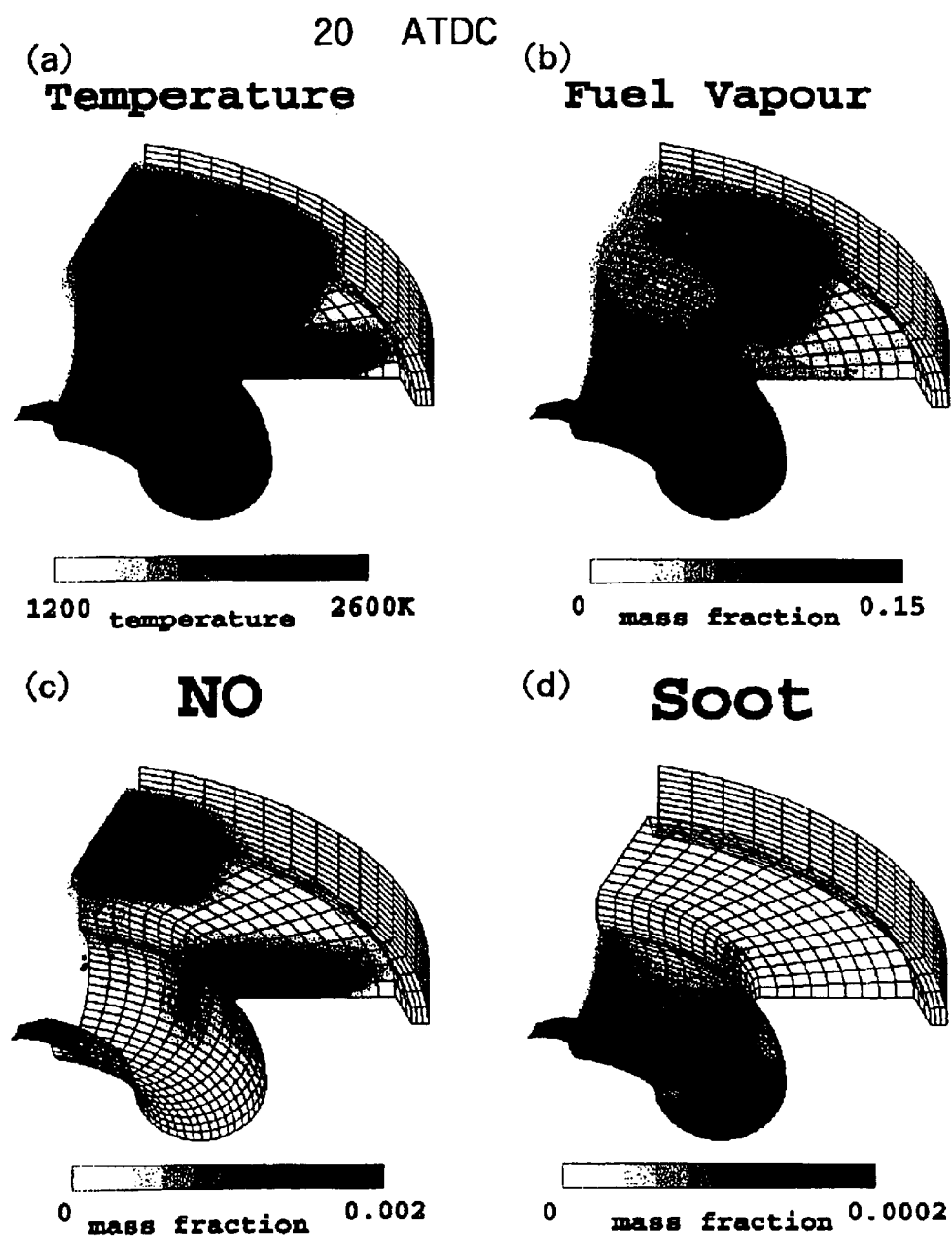
FIGS. 12(a), 12(b), 12(c) and 12(d) are views similar to those of FIGS. 11(a), 11(b), 11(c) and 11(d), with 20° ATDC.

Fifth Embodiment (FIGS. 11 and 12)

A direct-injection type compression-ignition internal combustion engine according to the present embodiment is different from that of the first embodiment, in that the present internal combustion engine is provided with an exhaust gas recirculating device which is arranged to recirculate a part of the exhaust gas flowing through the exhaust ports 7, so that this part of the exhaust gas is mixed with the second intake air 12 flowing through the upstream intake port 4. The recirculated exhaust gas is not mixed with the first intake air 11 flowing through the downstream intake port 3.

At a point of time near the terminal period of the compression stroke at which the combustion of the fuel injected from the fuel injector 2 is initiated, the first intake gas 11 primarily exists inside the generally flat hemispherical plane 13 having its center in the center portion of the top surface of the combustion chamber 1 from which the fuel is injected, while the second intake gas 12 primarily exists outside the generally flat hemispherical plane 13, as shown in FIG. 1. At the point of time at which the combustion of the fuel is initiated, the intake gas charge within the combustion chamber 1 consists of the intake gas 11 located inside the generally flat hemispherical plane 13 and having a low concentration of the recirculated exhaust gas, and the intake gas 12 located outside the plane 13 and having a high concentration of the recirculated exhaust gas.

Where the radius of the above-indicated generally flat hemispherical plane 13 as measured in the direction of injection of the fuel is about 1–1.5 times the spray breakup length of the injected fuel, the intake gas charge within the combustion chamber 1 is stratified as the intake gases 11, 12 existing in the fuel-air-mixture forming region and the flame-generating region of the combustion chamber 1, respectively. Upon initiation of the fuel combustion, the intake gas 12 having a high concentration of the recirculated exhaust gas exits in the flame-generating region including the squish area and the peripheral part of the cavity of the combustion chamber 1, so that the combustion temperature is lowered, with a result of reduction of the amount of production of NOx. At the same time, the intake gas 11 having a low concentration of the recirculated exhaust gas exists in the fuel-air-mixture forming region of the combustion chamber 1, so that this intake gas 11 having a high concentration of oxygen is fed by a jet of the fuel to the end portion of the fuel jet, thereby reducing a shortage of oxygen in the end portion of the jet of the burning fuel or in the cavity 9, whereby the amount of production of soot is reduced.

In the other aspects, the fifth embodiment is the same as the first embodiment.

Example of Simulation Test

In an internal combustion engine not arranged to recirculate the exhaust gas, distributions of the temperature, and amounts of fuel vapor, NO (nitrogen monoxide) and soot in the combustion chamber were obtained by numerical calculation, in the following operating conditions: engine operating speed=1800 rpm; number of the nozzle holes of the fuel injector=5; diameter of each nozzle hole=0.18 mm; amount of fuel injection=35 mm$^3$; pressure of fuel injection=55 MPa; and period of fuel injection=0–12.5° ATDC.

FIGS. 11(*a*) through 11(*d*) show the distributions with the fuel injection period of 10° ATDC, while FIGS. 12(*a*) through 12(*d*) show the distributions with the fuel injection period of 20° ATDC. FIGS. 11(*a*) and 12(*a*) show the distributions of the temperature. FIGS. 11(*b*) and 12(*b*) show the distributions of the amount of fuel vapor. FIGS. 11(*c*) and 12(*c*) show the distributions of the amount of NO. FIGS. 11(*d*) and 12(*d*) show the distributions of the amount of soot.

As shown in FIGS. 11(*a*) and 12(*a*), the combustion chamber 1 has a high-temperature region, in which the fuel jet injected by the fuel injector is burning, in the squish area and the peripheral part of the cavity.

As shown in FIGS. 11(*b*), 11(*c*), 12(*b*) and 12(*c*), NO is produced in a fuel-lean area of the high-temperature region, in which the fuel-air ratio is in the neighborhood of the stoichiometric value. It will be understood that when the flame-generating region including the squish area and the peripheral part of the cavity of the combustion chamber is charged with the intake gas having a high concentration of the recirculated exhaust gas, during the fuel combustion period, the combustion temperature is lowered, with a result of reduction of the amount of production of NO.

As shown in FIGS. 11(*b*), 11(*d*), 12(*b*) and 12(*d*), soot is produced in a fuel-rich area or oxygen-lean burning area of the high-temperature region, in which the fuel-air ratio is lower than the stoichiometric value, that is, in the end portion of the jet of the fuel injected by the fuel injector, or in the recessed portion of the cavity. It will be understood that when the fuel-air-mixture forming region including the root portion of the fuel jet is charged with the intake gas having a low concentration of the recirculated exhaust gas, upon initiation of the fuel combustion, this intake gas is fed by the fuel jet or fuel-air mixture stream to the end portion of the fuel jet, thereby reducing a shortage of oxygen in the end portion of the fuel jet or in the recessed portion of the cavity, whereby the amount of production of soot is reduced. At this time, however, an increase of NOx is prevented by controlling the oxygen concentration so as to prevent its increase to a level of production of NOx.

Sixth Embodiment

An internal combustion engine according to the present embodiment is different from that of the fifth embodiment, in that the intake valves 5, 6 in the downstream and upstream intake ports 3, 4 are held open for respective different periods as in the second embodiment, for increasing the degree of stratification of the intake gas charge containing the recirculated exhaust gas.

The present embodiment has a larger difference between the concentration values of the recirculated exhaust gas in the intake gases existing inside and outside the generally flat hemispherical plane 13 having its center at the position of the fuel injection, in the terminal period of the compression stroke, than in the fifth embodiment in which the intake valves 5, 6 are opened at the same point of time and held open for the same period of time. Accordingly, the amounts of NOx and soot can be both effectively reduced in the present embodiment.

In the other aspects, the sixth embodiment is the same as the fifth embodiment.

Seventh Embodiment

An internal combustion engine according to the present embodiment is different from that of the fifth embodiment, in that the second intake gas 12 is introduced into the combustion chamber 1 through only one of the two sections of the upstream intake port 4, as in the third embodiment, for increasing the degree of stratification of the intake gas charge containing the recirculated exhaust gas.

The present embodiment has a larger difference between the concentration values of the recirculated exhaust gas in the intake gases existing inside and outside the generally flat hemispherical plane 13 having its center at the position of the fuel injection, in the terminal period of the compression stroke, than in the fifth embodiment in which the second intake gas 12 is introduced into the combustion chamber 1 through the entirety of the upstream intake port 4. Accordingly, the amounts of NOx and soot can be both effectively reduced in the present embodiment.

In the other aspects, the seventh embodiment is the same as the fifth embodiment.

Figure 13:
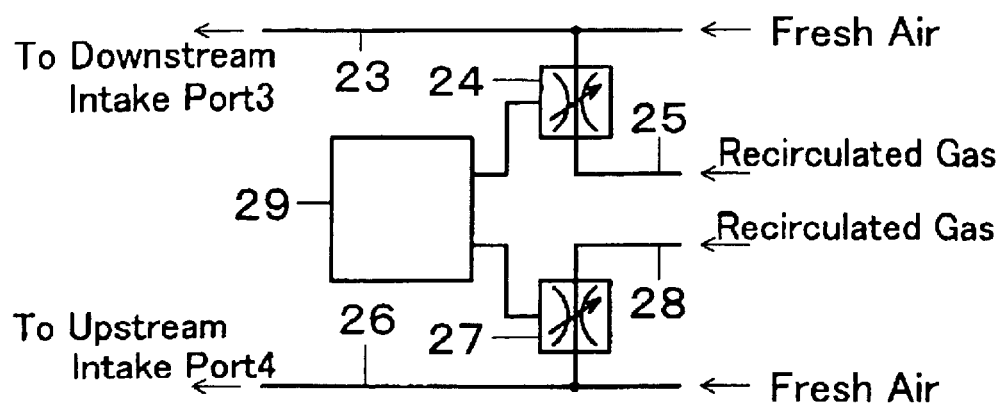
FIG. 13 is a schematic view of an intake passage portion of a direct-injection type internal combustion engine in an eighth embodiment of the invention.
Figure 14:
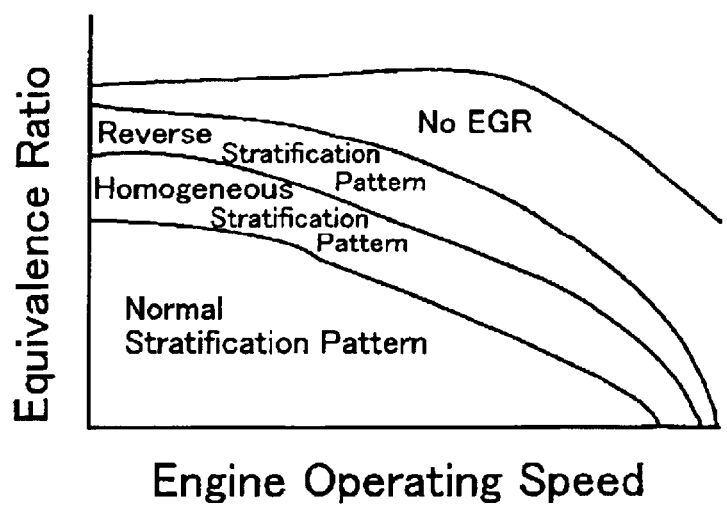
FIG. 14 is an operation data map in the internal combustion engine of FIG. 13.

Eighth Embodiment (FIGS. 13 and 14)

An internal combustion engine according to the present embodiment is different from that of the first embodiment, in that the present internal combustion engine is provided with an exhaust gas recirculating device and is controlled to change the pattern and degree of stratification of the intake gas charge in the combustion chamber 1, depending upon the operating conditions of the engine.

Namely, the internal combustion engine of the first embodiment is modified such that a first intake passage 23 connected to the downstream intake port 3 is connected to a first exhaust gas recirculating passage 25 through a first flow control valve 24, while a second intake passage 26 connected to the upstream intake port 4 is connected to a second exhaust gas recirculating passage 28 through a second flow control valve 27, as shown in FIG. 13. A device 29 is provided for controlling the amounts of opening of the first and second flow control valves 24, 27, depending upon the operating conditions.

By controlling the amounts of opening of the first and second flow control valves 24, 27 depending upon the operating conditions of the internal combustion engine, the amount of the recirculated exhaust gas to be mixed with the first intake air flowing through the downstream intake port 3, and the amount of the recirculated exhaust gas to be mixed with the second intake air flowing through the upstream intake port 4 are increased and reduced, so as to change the pattern of stratification of the intake gas charge within the combustion chamber 1, to one of: a normal stratification pattern in which the concentration of the recirculated exhaust gas in the region of the combustion chamber 1 inside the generally flat hemispherical plane 13 is lower than that in the region outside the generally flat hemispherical plane 13; a reverse stratification pattern in which the concentration of the recirculated exhaust gas in the region inside the generally flat hemispherical plane 13 is higher than that in the region outside the generally flat hemispherical plane 13;

and a homogeneous pattern in which the concentrations in the regions of the combustion chamber 1 inside and outside the generally flat hemispherical plane 13 are equal to each other.

The normal and reverse stratification patterns and the homogeneous pattern are selectively established according to an operation data map illustrated in FIG. 14.

The normal stratification pattern is established within the combustion chamber 1 when the internal combustion engine is operating under a low load and at a low speed. The normal stratification pattern is changed to the homogeneous pattern when the load and operating speed are increased, and then to the reverse stratification pattern when the load and operating speed are further increased.

The degree of the stratification is changed by controlling the amounts of opening of the first and second flow control valves 24, 27 depending upon the operating conditions of the internal combustion engine. The degree of the stratification, that is, the ratio of the concentration of the recirculated exhaust gas outside the generally flat hemispherical plane 13 to the concentration inside the generally flat hemispherical plane 13, more precisely, the ratio of the concentration of the recirculated exhaust gas in the peripheral bottom part of the cavity outside the generally flat hemispherical plane 13, to the concentration at the position of the fuel injection inside the generally flat hemispherical plane 13, is increased and reduced.

Ninth Embodiment

An internal combustion engine according to the present embodiment is different from that of the first embodiment, in that the present internal combustion engine is of premixing type arranged to inject a fuel at a premixing fuel-injection timing during the intake stroke.

Namely, the internal combustion engine of the first embodiment is modified such that after the swirl flow 11 of the first intake gas and the swirl flow 12 of the second intake gas have been formed along the cylindrical wall of the combustion chamber 1 and in the respective upper and lower portions of the combustion chamber 1, the fuel injector 2 is operated at the premixing fuel-injection timing during the intake stroke, to inject a portion or entirety of a required amount of fuel corresponding to a load presently acting on the engine, that is, a suitable premixing amount of fuel, from its multiple nozzle holes in the radial directions toward the swirl flow 11 of the first intake gas, so that the sprayed fuel is mixed with the swirl flow 11 of the first intake gas, with substantially no mixing of the sprayed fuel with the swirl flow 12 of the second intake gas.

At a point of time near the terminal period of the compression stroke, the first intake gas 11 primarily exists within the central portion 13 of the combustion chamber 1 including a central part of the top surface of the combustion chamber 1 from which the fuel is injected, while the second intake gas 12 primarily exists in the region outside the central portion 13. Upon initiation of the fuel combustion, the intake gas 11 having a high concentration of fuel exists in the axisymmetric central portion 13, while the intake gas 12 having a low concentration of fuel exists in the peripheral portion of the combustion chamber 1 such as the squish area, and near the peripheral and bottom surfaces of the cavity 9, that is, near the wall surfaces of the cavity 9.

Upon initiation of the fuel combustion, the fuel concentration is low in the peripheral portion of the combustion chamber 1, the squish area and near the wall surfaces of the cavity 9, so that the quenching is unlikely to occur in the squish area and near the wall surfaces of the cavity 9. Further, the fuel combustion takes place primarily within the central portion 13 of the combustion chamber 1 in which the fuel concentration is high. Accordingly, the combustion temperature and consequently the combustion rate are made higher in the central portion 13 of the combustion chamber 1. As a result, the amounts of HC, SOF and white smoke left in the exhaust gas can be effectively reduced.

The present embodiment has another advantage that the premixing combustion of a portion or entirety of the required amount of fuel corresponding to the present engine load permits an increase in the output torque of the engine in the full-load operation, while reducing the amounts of NOx and smoke left in the exhaust gas.

Figure 15:
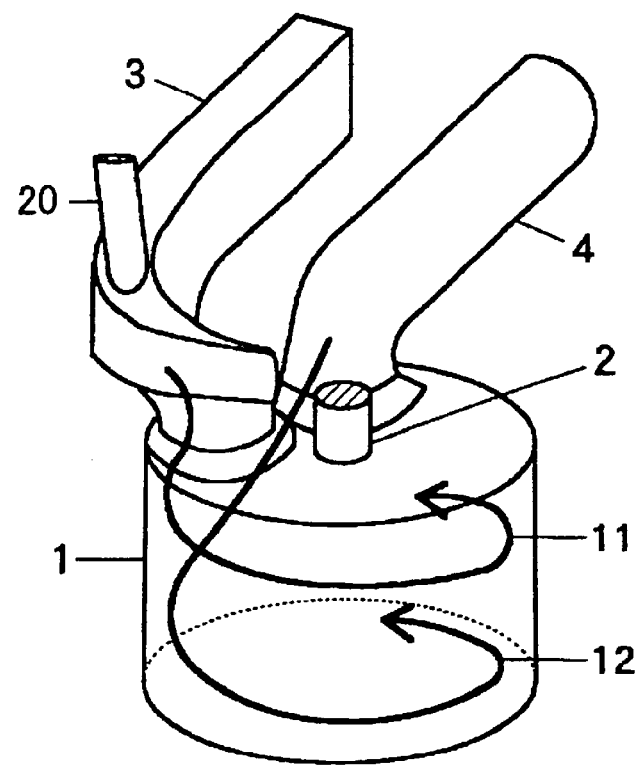
FIG. 15 is a schematic perspective view of an internal combustion engine in an intermediate period of the compression stroke of the internal compression engine in a tenth embodiment of the invention.
Figure 16:
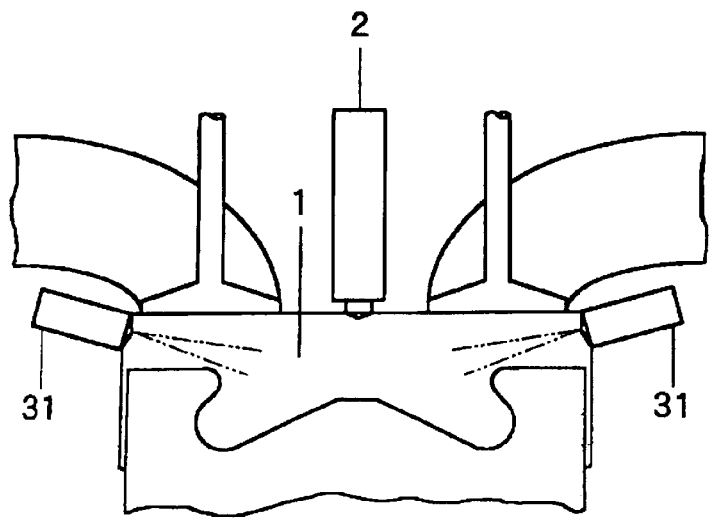
FIG. 16 is a schematic view in vertical cross section of a premixing type internal combustion engine according to a second prior art.

Tenth Embodiment (FIG. 15)

An internal combustion engine according to the present embodiment is different from that of the ninth embodiment, in that the intake port 3 located downstream of the swirl flow is provided with a premixing fuel injector 20, as shown in FIG. 15, in addition to the ordinary fuel injector 2 provided in the central part of the top surface of the combustion chamber 1.

In the intake stroke, the swirl flow 11 of the first intake gas and the swirl flow 12 of the second intake gas are formed along the cylindrical wall of the combustion chamber 1 and in the respective upper and lower portions of the combustion chamber 1, as in the ninth embodiment. The premixing fuel injector 20 is operated at a premixing fuel-injection timing during the intake stroke, to inject a portion of a required amount of fuel corresponding to the present engine load, that is, a suitable premixing amount of fuel, into the first intake gas flowing through the downstream intake port 3, so that the swirl flow 11 of the first intake gas injected from the downstream intake port 3 into the combustion chamber 1 contains the fuel, with substantially no mixing of the fuel with the swirl flow 12 of the second intake gas injected from the upstream intake port 4 into the combustion chamber 1.

At a point of time near the terminal period of the compression stroke, the intake gas 11 having a high concentration of fuel exists in the axisymmetric central portion 13 of the combustion chamber 1, while the intake gas 12 having low concentration of fuel exists in the peripheral portion of the combustion chamber 1, the squish area and near the wall surfaces of the cavity 9, as in the ninth embodiment. At the normal fuel-injection timing near the terminal period of the compression stroke, the ordinary fuel injector 2 is operated to inject the remaining portion of the required amount of fuel into the intake gas 11 which exists in the central portion 13 of the combustion chamber 1 and which has a high concentration of fuel.

Upon initiation of the fuel combustion, the degree of stratification within the combustion chamber 1 consisting of the intake gas having the high concentration of fuel in the central portion 13, and the intake gas having the low concentration of fuel in the peripheral portion, the squish area and near the wall surfaces of the cavity 9, is increased. Accordingly, the present embodiment is effective to prevent the quenching in the squish area of the combustion chamber 1 and near the wall surfaces of the cavity 9, and is also effective to reduce the amounts of HC and SOF left in the exhaust gas and the amount of white smoke produced during an operation of the engine in a cold state.

The premixing fuel injector 20 is single and is provided for one combustion chamber 1. Namely, it is not necessary to provide a plurality of premixing fuel injectors 20 for one combustion chamber. In a multiple-cylinder engine having a plurality of combustion chambers 1, a single premixing fuel injector 20 may be provided in a common intake passage which is held in communication with the intake port 3 of each combustion chamber 1.

In the other aspects, the tenth embodiment is the same as the ninth embodiment.

Eleventh Embodiment

An internal combustion engine according to the present embodiment is different from that of the ninth embodiment, in that the fuel injector 2 provided in the central part of the top surface of the combustion chamber 1 is variable in its fuel injecting characteristics such as the direction of fuel injection, angle of fuel spraying and fuel penetration force.

The fuel injecting characteristics of the variable type fuel injector 2 are controlled so that a portion of the required amount of fuel corresponding to the present engine load, that is, a suitable premixing amount of fuel is injected at a premixing fuel-injection timing before 30° BTDC during the intake stroke or compression stroke, into the swirl flow 11 of the first intake gas which is present primarily in the central portion 13 of the combustion chamber 1 upon initiation of the fuel combustion, with suitable fuel injecting characteristics that a most of the sprayed amount of fuel is mixed with that swirl flow 11. The remaining portion of the required amount of fuel is injected at the normal fuel-injection timing near the terminal period of the compression stroke, with fuel injecting characteristics suitable for the normal fuel injection.

Upon initiation of the fuel combustion, the degree of stratification within the combustion chamber 1 consisting of the intake gas having a high concentration of fuel in the axisymmetric central portion 13, and the intake gas having a low concentration of fuel in the peripheral portion of the combustion chamber 1, the squish area and near the wall surfaces of the cavity 9, is increased. Accordingly, the present embodiment is effective to prevent the quenching in the squish area of the combustion chamber 1 and near the wall surfaces of the cavity 9.

In the other aspects, the eleventh embodiment is the same as the ninth embodiment.

An effect that a suitable premixing amount of fuel is mixed with a specific intake gas swirl flow only is increased, by implementing a plurality of premixing fuel injecting operations using a fuel injector of variable or non-variable type, with a reduced amount of fuel injection and/or a reduced fuel penetration force in each premixing fuel injecting operation, or with adjustment of the direction of fuel injection and/or the angle of fuel spraying.

Twelfth Embodiment

An internal combustion engine according to the present embodiment is different from that of the tenth embodiment, in that the intake ports 5, 6 in the upstream and downstream intake ports 3, 4 are held open for respective different periods as in the second embodiment, for controlling the degree of stratification of the intake gas charge containing the fuel.

The degree of vertical stratification of the first and second intake gases 11, 12 in the terminal period of the intake stroke is improved, with a larger difference between the concentration values of the fuel in the intake gases existing inside and outside the central portion 13 of the combustion chamber 1 upon initiation of the fuel combustion in the terminal period of the compression stroke, than in the tenth embodiment in which the intake valves 5, 6 are opened at the same point of time and held open for the same period of time.

Further, a valve-timing changing device is provided for changing the timings at which the intake valve 5 in the downstream intake port 3 is opened and closed, and the timings at which the intake valve 6 in the upstream intake port 4 is opened and closed. These valve timings are changed depending upon the operating condition of the internal combustion engine. Upon initiation of the fuel combustion, the fuel concentration of the intake gas existing outside the central portion 13 of the combustion chamber 1 is changed with respect to the fuel concentration of the intake gas existing inside the central portion 13, depending upon the operating conditions of the engine.

In addition, a swirl-strength changing device is provided for changing the strength of the swirl flow 11 of the first intake gas and the strength of the swirl flow 12 of the second intake gas, depending upon the operating conditions of the internal combustion engine. Upon initiation of the fuel combustion, the fuel concentration of the intake gas existing outside the central portion 13 of the combustion chamber 1 is changed with respect to the fuel concentration of the intake gas existing inside the central portion 13, depending upon the operating conditions of the engine.

In the other aspects, the twelfth embodiment is the same as the tenth embodiment.

Industrial Applicability

The direct-injection type internal combustion engine of the present invention is usable as a drive power source for automotive vehicles, aircraft, ships and so forth.

What is claimed is:

1. A method of stratifying an intake gas charge within a combustion chamber of a direct-injection type internal combustion engine, comprising the steps of:

injecting a fuel into the combustion chamber; and introducing intake gases into the combustion chamber such that intake gases of different compositions exist in a central portion of the combustion chamber, which is a region inside a generally hemispherical or generally flat hemispherical plane having a center at a position of injection of the fuel, and in a peripheral portion of the combustion chamber, which is a region outside the generally hemispherical or generally flat hemispherical plane, upon initiation of combustion of the fuel at a point of time near a terminal period of a compression stroke.

2. A method according to claim 1, wherein said intake gases of different compositions are intake gases having different concentrations of a specific component contained therein.

3. A method according to claim 2, wherein a pattern of stratification of the intake gas charge within the combustion chamber is changed depending upon operating conditions of said internal combustion engine, to a selected one of:

a normal stratification pattern in which the concentration of the specific component of the intake gas in said central portion is lower than that of the intake gas in said peripheral portion;

a reverse stratification pattern in which the concentration of the specific component of the intake gas in said central portion is higher than that of the intake gas in said peripheral portion; and a homogeneous pattern in which the concentration of the specific component of the intake gas in said central portion is equal to that of the intake gas in said peripheral portion.

4. A method according to claim 3, wherein said internal combustion engine is a compression-ignition internal combustion engine.

5. A method according to claim 2, wherein a ratio of the concentration of the specific component of the intake gas in said peripheral portion to that of the intake gas in said central portion is changed depending upon operating conditions of said internal combustion engine.

6. A method according to claim 5, wherein said internal combustion engine is a compression-ignition internal combustion engine.

7. A method according to claim 1, wherein said internal combustion engine is a compression-ignition internal combustion engine.

8. A device for stratifying an intake gas charge within a combustion chamber of a direct-injection type internal combustion engine in which a plurality of intake ports are provided to form a plurality of swirl flows of intake gases in a same direction of rotation in the combustion chamber and in which a fuel is injected into the combustion chamber, from a center portion of a top surface of the combustion chamber opposed to a top face of a piston, toward a peripheral part of a cavity formed in a central portion of the top face of the piston, said device comprising:

an arrangement for forming, in an intake stroke, a swirl flow of a first intake gas in an upper portion of the combustion chamber, along a cylindrical wall of the combustion chamber, and a swirl flow of a second intake gas in a lower portion of the combustion chamber, along the cylindrical wall of the combustion chamber, and for maintaining a state of vertical stratification of the intake gas charge consisting of the swirl flows of the first and second intake gases within the combustion chamber, up to a point of time within an intermediate period of a compression stroke;

an arrangement for causing the first intake gas to flow into a central region of the cavity in the central portion of the top face of the piston, while the second intake gas remains in a peripheral region and a bottom region of the cavity, in a latter half of a compression stroke in which a squish flow is created; and an arrangement for stratifying the intake gas charge within the combustion chamber at a point of time near a terminal period of the compression stroke in which the combustion of the fuel is initiated, such that the first intake gas exists primarily in a region inside a generally hemispherical or generally flat hemispherical plane having its center at a position of injection of the fuel into the combustion chamber, while the second intake gas exists primarily in a region outside the generally hemispherical or generally flat hemispherical plane.

9. A device according to claim 8, wherein said generally hemispherical or generally flat hemispherical plane is spaced from the position of injection of the fuel into the combustion chamber, in a direction of injection of the fuel, by a distance 1–1.5 times a spray breakup length of the injected fuel.

10. A device according to claim 8, wherein said internal combustion engine is a compression-ignition internal combustion engine.

11. A device according to claim 8, wherein a first intake valve in the intake port for forming the swirl flow of the first intake gas in the upper portion of the combustion chamber and a second intake valve in the intake port for forming the swirl flow of the second intake gas in the lower portion of the combustion chamber are opened for respective different periods, so that only the second intake valve is open to permit only the second intake gas to flow into the combustion chamber in an initial period of the intake stroke, so that the first and second intake valves are open to permit the first and second intake gases to flow into the combustion chamber in an intermediate period of the intake stroke, and so that only the first intake valve is open to permit only the first intake gas to flow into the combustion chamber in a terminal period of the intake stroke.

12. A direct-injection type internal combustion engine wherein a fuel is injected into a combustion chamber, said engine comprising:

an arrangement for stratifying an intake gas charge such that an intake gas not containing a recirculated exhaust gas or having a low concentration of the recirculated exhaust gas exists in one of a central portion of the combustion chamber including a position of injection of the fuel and a peripheral portion of the combustion chamber, while an intake gas containing the recirculated exhaust gas or having a high concentration of the recirculated exhaust gas exists in the other of the central and peripheral portions of the combustion chamber, upon initiation of combustion of the fuel at a point of time near a terminal period of a compression stroke.

13. A direct-injection type internal combustion engine according to claim 12, wherein said internal combustion engine is a compression-ignition internal combustion engine.

14. A direct-injection type internal combustion engine according to claim 12, wherein the intake gas containing the recirculated exhaust gas or having the high concentration of the recirculated exhaust gas exists in said central portion of the combustion chamber, while the intake gas not containing or having the low concentration of the recirculated exhaust gas exists in said peripheral portion, upon initiation of combustion of the fuel at the point of time near the terminal period of the compression stroke, when the internal combustion engine is operated under a high load or at a high speed.

15. A direct-injection type internal combustion engine according to claim 14, wherein said internal combustion engine is a compression-ignition internal combustion engine.

16. A direct-injection type internal combustion engine according to claim 12, wherein a ratio of the concentration of the recirculated exhaust gas in said peripheral portion to the concentration of the recirculated exhaust gas in said central portion is changed depending upon operating conditions of the internal combustion engine.

17. A direct-injection type internal combustion engine in which a plurality of intake ports are provided to form a plurality of swirl flows of intake gases in a same direction of rotation in a combustion chamber and in which a fuel is injected into the combustion chamber, from a center portion of a top surface of the combustion chamber opposed to a top face of a piston, toward a peripheral part of a cavity formed in a central portion of the top face of the piston, said engine comprising:

an arrangement for forming, in an intake stroke, a swirl flow of a first intake gas not containing a recirculated exhaust gas, along an upper portion of a cylindrical wall of the combustion chamber, and a swirl flow of a second intake gas containing the recirculated exhaust gas, along a lower portion of the cylindrical wall of the combustion chamber;

an arrangement for causing the first intake gas to flow into a central region of the cavity in the central portion of the top face of the piston, while the second intake gas remains in a peripheral region and a bottom region of the cavity, in a latter half of a compression stroke in which a squish flow is created; and an arrangement for stratifying an intake gas charge within the combustion chamber at a point of time near a terminal period of the compression stroke in which the combustion of the fuel is initiated, such that the intake gas not containing the recirculated exhaust gas or having a low concentration of the recirculated exhaust gas exists in a region inside a generally hemispherical or generally flat hemispherical plane having its center at a position of injection of the fuel into the combustion chamber, while the intake gas containing the recirculated exhaust gas or having a high concentration of the recirculated exhaust gas exists in a region outside the generally hemispherical or generally flat hemispherical plane.

18. A direct-injection type internal combustion engine according to claim 17, wherein said internal combustion engine is a compression-ignition internal combustion engine.

19. A direct-injection type internal combustion engine according to claim 17, wherein a first intake valve in the intake port for forming the swirl flow of the first intake gas in the upper portion of the combustion chamber and a second intake valve in the intake port for forming the swirl flow of the second intake gas in the lower portion of the combustion chamber are opened for respective different periods, so that only the second intake valve is open to permit only the second intake gas to flow into the combustion chamber in an initial period of the intake stroke, so that the first and second intake valves are open to permit the first and second intake gases to flow into the combustion chamber in an intermediate period of the intake stroke, and so that only the first intake valve is open to permit only the first intake gas to flow into the combustion chamber in a terminal period of the intake stroke.

20. A direct-injection type internal combustion engine according to claim 19, wherein said internal combustion engine is a compression-ignition internal combustion engine.

21. A direct-injection type internal combustion engine according to claim 17, wherein said generally hemispherical or generally flat hemispherical plane is spaced from the position of injection of the fuel into the combustion chamber, in a direction of injection of the fuel, by a distance 1–1.5 times a spray breakup length of the injected fuel.

22. A direct-injection type internal combustion engine of compression-ignition or spark-ignition type in which a fuel is injected into an intake gas within a combustion chamber or to the intake gas within the combustion chamber and an intake gas within an intake passage and in which combustion of the fuel is initiated at a point of time near a terminal period of a compression stroke, said engine comprising:

a cavity formed in a central portion of a top face of a piston;

a spuish area over a peripheral portion of the top face of the piston;

an arrangement for stratifying an intake gas charge within the combustion chamber such that an intake gas containing a fuel or having a high concentration of the fuel exists in a central portion of the combustion chamber including a center portion of a top surface of the combustion chamber, while an intake gas not containing the fuel or having a low concentration of the fuel exists in the squish area and near wall surfaces of the cavity, upon initiation of combustion of the fuel.

23. A direct-injection type internal combustion engine according to claim 22, wherein a ratio of the concentration of the fuel in the intake gas existing upon initiation of combustion of the fuel in the peripheral portion of the combustion chamber, to the concentration of the fuel in the intake gas existing in the central portion of the combustion chamber including the center portion of the top surface is changed depending upon operating conditions of the internal combustion engine.

24. A direct-injection internal combustion engine of compression-ignition or spark-ignition type in which a plurality of intake ports are provided to form a plurality of swirl flows of intake gases in a same direction of rotation in the combustion chamber and in which a premixing amount of a fuel is injected into the combustion chamber or an intake passage, at a premixing fuel-injection timing before 30° BTDC in an intake or compression stroke, and in which combustion of the fuel is initiated at a point of time near a terminal period of a compression stroke, said engine comprising:

a cavity formed in a central portion of a top face of a piston;

a squish area over a peripheral portion of the top face of the piston;

an arrangement for injecting the premixing amount of the fuel into a swirl flow of a specific intake gas within the combustion chamber, or into an intake gas in a specific intake port or an intake passage including the specific intake port, and an arrangement for stratifying an intake gas charge within the combustion chamber upon initiation of combustion of the fuel, such that an intake gas containing the fuel or having a high concentration of the fuel exists in a central portion of the combustion chamber including a center portion of a top surface of the combustion chamber, while an intake gas not containing the fuel or having a low concentration of the fuel exists in the squish area and near wall surfaces of the cavity.

25. A direct-injection internal combustion, engine according to claim 24, comprising:

an arrangement for forming, in an intake stroke, a swirl flow of a first intake gas along an upper portion of the combustion chamber, and a swirl flow of a second intake gas along a lower portion of the combustion chamber, and for injecting the premixing amount of the fuel into the first intake gas; and an arrangement for causing the first intake gas to flow into a central region of a cavity in a central portion of a top face of a piston, while the second intake gas remains in a peripheral region and a bottom region of the cavity, in a latter half of the compression stroke in which a squish flow is created.

26. A direct-injection internal combustion engine according to claim 24, wherein said premixing amount of the fuel is injected from a fuel injector disposed on a top surface of the combustion chamber, into the intake gas within the combustion chamber, said fuel injector is a variable type fuel injector which is variable in its fuel injecting characteristics such as a direction of injection of the fuel, an angle of spraying of the fuel and a penetration force of the fuel; and said fuel injecting characteristics are controlled to be suitable for permitting a most of the fuel injected at said premixing fuel-injection timing, to be mixed with only the swirl flow of the intake gas which exists, upon initiation of combustion of the fuel, primarily in a central portion of the combustion chamber including a center portion of the top surface of the combustion chamber.

* * * * *

UNITED STATES PATENT AND TRADEMARK OFFICE
CERTIFICATE OF CORRECTION

PATENT NO. : 6,799,551 B2
DATED : October 5, 2004
INVENTOR(S) : Kiyomi Nakakita et al.

Page 1 of 1

It is certified that error appears in the above-identified patent and that said Letters Patent is hereby corrected as shown below:

Column 25,
Line 47, please delete "spuish" and insert -- squish --;

Column 26,
Line 32, please delete "combustion, engine" and insert -- combustion engine --.

Signed and Sealed this

Nineteenth Day of April, 2005

JON W. DUDAS
*Director of the United States Patent and Trademark Office*